United States Patent [19]
Kimura et al.

[11] Patent Number: 5,579,850
[45] Date of Patent: Dec. 3, 1996

[54] CULTIVATING SYSTEM AND CULTIVATING MACHINE WITH PLOW-DEPTH CONTROL FUNCTION

[75] Inventors: Shigetoshi Kimura; Masami Onodera; Yoshinori Takahashi, all of Ibaraki-ken, Japan

[73] Assignee: Sugano Farm Machinery Mfg. Co., Ltd., Sorachi-gun, Japan

[21] Appl. No.: 321,997

[22] Filed: Oct. 12, 1994

[51] Int. Cl.[6] .................................................. A01B 63/111
[52] U.S. Cl. ............................ 172/4; 172/425; 172/449; 172/414
[58] Field of Search .............................. 172/4, 4.5, 5, 6, 172/7, 272, 4.14, 4.15, 423, 425, 445.1, 449; 364/424.07; 37/348, 382

[56] References Cited

U.S. PATENT DOCUMENTS

| | | | |
|---|---|---|---|
| 2,405,334 | 8/1946 | Silver | 172/4 |
| 2,527,840 | 10/1950 | Mott | 172/4 |
| 2,567,107 | 9/1951 | Gobeil | 172/4 |
| 2,621,575 | 12/1952 | Berg | 172/4 |
| 2,627,797 | 2/1953 | Acton | 172/4 |
| 2,663,239 | 12/1953 | Rapp et al. | |
| 2,722,874 | 11/1955 | Bopf | |
| 2,729,156 | 1/1956 | Willey | |
| 2,755,721 | 7/1956 | Rusconi | 172/4 |
| 2,913,878 | 11/1959 | Rue | 172/4 |
| 2,924,285 | 2/1960 | Du Shane et al. | 172/4 |
| 3,106,253 | 10/1963 | Silver et al. | |
| 3,136,371 | 6/1964 | Rau et al. | 172/4 |
| 3,251,422 | 5/1966 | Allgaier et al. | 172/4 |
| 3,495,663 | 2/1970 | Scholl et al. | 172/4.5 |
| 3,782,478 | 1/1974 | McRay | 172/4.5 |
| 3,791,452 | 2/1974 | Long et al. | 172/4.5 |
| 4,934,463 | 6/1990 | Ishida et al. | 172/4.5 |
| 5,207,739 | 5/1993 | Orthman | 172/5 |

FOREIGN PATENT DOCUMENTS

| | | |
|---|---|---|
| 1356188 | 6/1964 | France. |
| 1577450 | 8/1969 | France. |
| 1164729 | 3/1964 | Germany. |
| 4001495 | 4/1991 | Germany. |
| 801625 | 9/1958 | United Kingdom. |
| 1094226 | 12/1967 | United Kingdom. |

*Primary Examiner*—Terry Lee Melius
*Assistant Examiner*—Victor Batson
*Attorney, Agent, or Firm*—Kanesaka & Takeuchi

[57] ABSTRACT

A cultivating system including a tractor, a cultivating machine for performing a cultivating work in combination with the tractor, and a link mechanism for linking the tractor and the cultivating machine, includes a free-motion mechanism provided to at least one of the tractor, the cultivating machine and the link mechanism, and having a free motion permissible zone in which at least one of the tractor, the cultivating machine and the link mechanism is freely movable relatively to the others in accordance with variation of a cultivation attitude of the cultivating machine due to variation of a cultivation environment, a cultivation-condition control mechanism for detecting the free motion of at least one of the tractor, the cultivating machine and the link mechanism within the free motion permissible zone in accordance with the variation of the cultivation environment, and moving the cultivating machine in accordance with the free motion permissible zone so as to offset the variation of the attitude of said cultivating machine due to the variation of the cultivation environment, whereby the cultivating machine performs its cultivating work in a desired invariable cultivation condition, and a free-motion transmitting mechanism for transmitting the free motion in the free motion permissible zone to the cultivation-condition control mechanism.

20 Claims, 16 Drawing Sheets

F I G .13
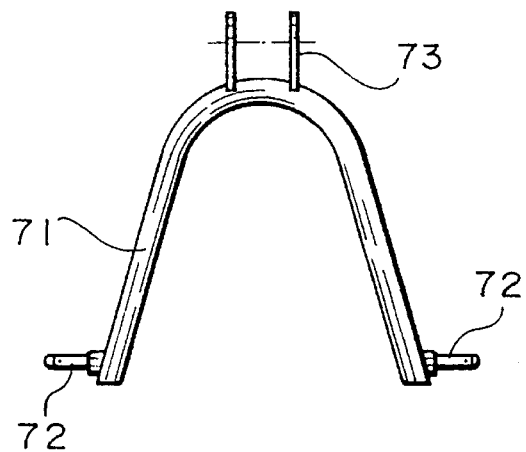
F I G .14
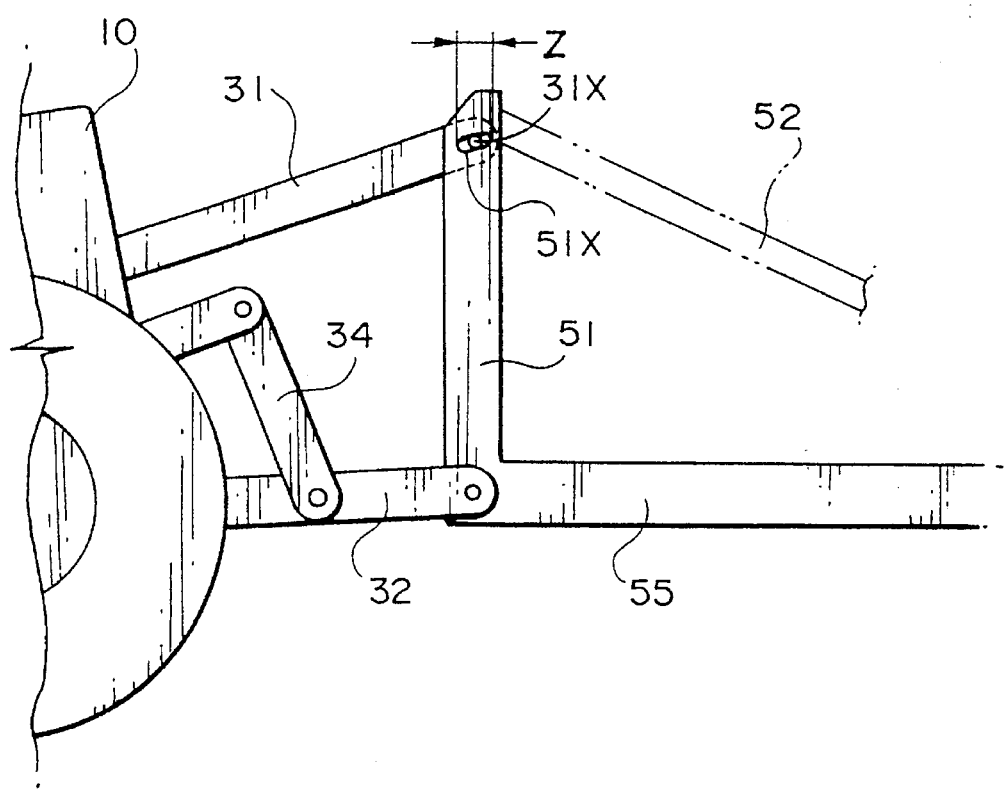

F I G . 20
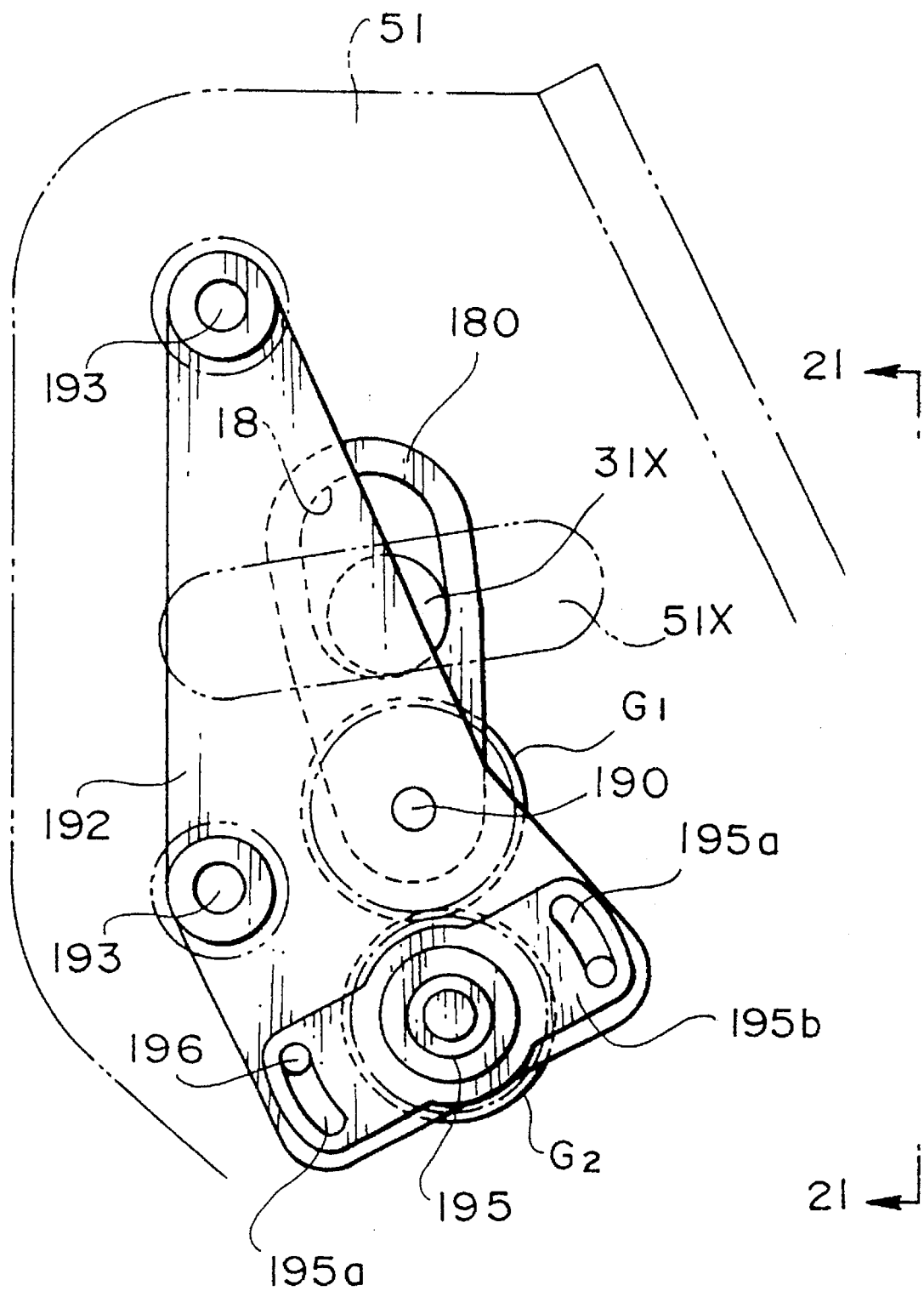

CULTIVATING SYSTEM AND CULTIVATING MACHINE WITH PLOW-DEPTH CONTROL FUNCTION

BACKGROUND OF THE INVENTION

1. Field of the Invention

This invention relates to a cultivating system for performing cultivating work such as plow work using a tractor and a plowing machine while controlling and keeping a plow depth to a desired value irrespective or variation of cultivation environments such as unevenness of the surface of soil, variation of soil type, variation in hardness of soil, etc.

2. Description of Related Art

It has been generally known that subsoil breaking work is indispensable to make such an improvement of soil that water retentivity is provided not only to a sole pan which is located below a tilth layer, but also to a subsoil layer which is located below the sole pan and has a water-impermeable property through breaking work of the sole pan and the subsoil layer in a field. For growing of crops, It is ideal that the tilth layer has a water retentivity for keeping a proper amount of water therein and it has a sufficient thickness. When the tilth layer is slightly dried and subsoil contains water, roots of crops can extend deeply into soil and absorb water, so that these crops can avoid suffering from a drought even when rain is insufficient.

For example in a case where a dry field such as a plowed field, a farm or the like is required to be formed in a wet field such as a paddy field, the dry field must be formed to have a capability of surely excluding water in its tilth layer because crops to be grown in the plowed field are liable to surfer greater damage than those in paddy field when they are immersed in water.

For a paddy field, particularly a paddy field having heavy clay soil, its subsoil is liable to be consolidated due to pressing and puddling or soil by a large tractor, so that soil properties such as gas permeability, water permeability, water retentivity, etc. are degraded. In addition, the tilth layer becomes gradually shallower by a rotary tillage or cultivating work which is repeated in every year, and thus a water-impermeable sole pan is formed below the tilth layer.

Even when a culvert is provided at the lower side of the sole pan, in a large amount of rain, wter is kept in the tilth layer to become an excessively wet state, that is, in a muddy state. Conversely, When there is no rain for a long time, the sole pan prevents water-absorption of a lower layer portion below the tilth layer, so that the tilth layer is kept in a dry state and suffers drought damage.

Accordingly, when a dry field such as a plowed field is formed in a wet field such as a paddy field, it is required that a sole pan of the dry field, which deteriorates water permeability and water retentivity, is broken, and at the same time a subsoil layer below the sole pan is kept in a soft state to improve gas permeability and water permeability of soil, and that a cultivation depth is set to a depth suitable for growing of crops in the plowed field, for example, 20 to 30 cm.

In view of the foregoing, the following methods have been hitherto adopted. That is, in one method, the sole pan is broken and subsoil is made soft by a subsoil breaking machine, and then the tilth layer is plowed and reversed by a plowing machine. In the other method, both of the tilth layer and the sole pan are simultaneously plowed and reversed, and the subsoil layer is made soft.

In a case where a cultivation environment is not homogeneous in a cultivating or plowing direction in a field, for example hardness of soil is not constant in the direction of cultivating work and thus hard and soft areas alternately exist along the cultivation direction in the field, a bottom position of a shear varies in accordance with the variation of hardness of soil. For example, the shear of plow is lifted up (floated) at a hard area because the friction resistance between the shear and soil is large at the hard area. On the other hand, the shear moves deeply into soil at a soft area because the Friction resistance is small at soft area. Accordingly, an operator on a tractor must control the position of a chisel (plow) through a manual lift operation wherever the hardness of soil varies.

Further, in a case where soil of the field has an uneven surface in the plowing direction, time cultivating machine such as a plow machine is shifted upwardly or downwardly whenever wheels of the tractor pass over a recess or projecting portion, and thus the plowing depth is varied in accordance with unevenness of the soil surface. For example, when the tractor passes over an uneven area, the attitude of the tractor is varied to a backwardly-tilted or forwardly-tilted state. In the former state, the plow machine is forwardly tilted and thus the shear of a bottom plow trends to deeply enter into soil. In this case, a load imposed on the plow is increased. On the other hand, in the latter state, the plow machine is backwardly tilted and thus the shear trends to be floated, and thus the sole pan and the subsoil layer cannot be sufficiently broken.

As described above, in cultivating for soil using a well-known tractor and cultivating machine such as a plow, subsoiler or the like, the cultivating (plowing) depth is required to be kept to a desired depth at all times. In order to meet this requirement, in addition to the manual control of the position of the chisel as described above, it has been also proposed that the tractor is provided with a draft function or that a lift mechanism is actuated while measuring the height of the plow from the ground.

Specifically, in one method, the cultivating machine is upwardly or downwardly moved while detecting an upward or downward motion of a gage wheel which moves in contact with the ground, in other words, while detecting an angle between a wheel arm got supporting the gage wheel and a frame of the cultivating machine. In another method, ultrasonic wave or light is emitted to the ground and a current cultivation or plow depth is measured by detecting ultrasonic wave or light which is reflected from the ground. The cultivating machine is upwardly downwardly moved on the basis of the measurement result. The former method is representatively disclosed in Japanese Utility Mode Publication (KOKOKU) No. 5-1221.

In such a cultivating system, a tractor and a cultivating machine such as a plow are linked to each other through a three-point link (hitch) mechanism. The linkage between tractor and the cultivating roaching is regarded as a rigid joint, and thus the joined body of the tractor and the cultivating machine must be treated as one rigid body. Therefore, when an excessive load which exceeds the tractive capacity of a tractor is imposed on the tractor, the following troubles occur .in the conventional cultivating system. That is, when such an excessive load is imposed on the tractor, the tractor is kept in such a state that front wheels of the tractor are floated while rear wheels thereof are contacted with the ground. Therefore, the tractor loses its tractive force, and it is impossible for the tractor to continue cultivating work. On the other hand, when the tractor forcedly continues the cultivating work under such an excessive load in a state where the front wheels thereof are not floated, the cultivating machine (plow machine) may be damaged. In order to prevent such troubles, a tractor is designed to a heavy and rigid body to increase its weight because the tractive capacity of the tractor is proportional to its weight. In addition, with respect to the cultivating machine, it is also designed to a heavy and rigid body, and these heavy and rigid tractor and cultivating machine are linked to each other. As described above, the "excessive-load trouble" as described above can be overcome by increasing the weight of the tractor and the cultivating machine (cultivating system), and thus by increasing the tractive force of the cultivating system.

Those tractors which are used for cultivating works in large-scale fields, for example, in U.S.A., Europe, etc., are generally designed in a relatively large size with a large power. Therefore, the large-scale and large power tractors and cultivating machines suitable for these tractors have been widely used in such countries. However, those tractors which are used for cultivating works in small-scale fields, for example, in Japan, are generally designed in a relatively small size with a small power because such compact tractors are capable of making a small sharp turn in relatively small-scale fields. Therefore, the small-scale and small power tractors and cultivating machines suitable for these tractors have been widely used in Japan.

If these tractors and the cultivating machines which are suitably used for small-scale fields are applied to geographically complicated fields, for example, a field whose soil surface is uneven in a cultivating direction, a field having various soil types (variation in hardness of soil) in a cultivating direction, etc., cultivating work cannot be efficiently performed for the teasotis as described above. Therefore, the large-scale and large-power tractors have been hitherto required to be used in such complicated fields.

SUMMARY OF THE INVENTION

An object of the present invention is to provide a cultivating system in which an excellent-cultivating work can be performed with a large tractive force irrespective of variation of cultivation environments such as unevenness of soil surface, variation of soil types (hardness of soil), etc. even when a relatively light and compact tractor is used, thereby keeping the cultivating depth to a desired fixed value.

Another object of the present invention is to provide a tractor with which the cultivating depth can be kept constant irrespective of variation of cultivating environments to thereby enable excellent cultivating work.

A further object of the present invention is to provide a cultivating machine to be linked to a tractor, in which the cultivating depth can be kept constant irrespective of variation of cultivating environments to whereby enable excellent cultivating work.

In order to attain the above objects, according to one aspect of the present invention, a cultivating system using a cultivating machine for performing cultivating work for soil, a tractor having a hydraulic lift mechanism for upwardly or downwardly moving the cultivating machine and a link mechanism having an upper link and a lower link for linking the tractor and the cultivating machine, includes a free-motion mechanism provided to at least one of the tractor, the cultivating machine and the link mechanism, and having a free motion permissible zone in which the one of the tractor, the cultivating machine and the link mechanism is freely movable relatively to the rest of the tractor, cultivating machine and line mechanism in accordance with variation of a cultivation akude of the cultivating machine due to variation of a cultivation environment, a cultivation-condition control mechanism for detecting a free motion of the one of the tractor, the cultivating machine and the link mechanism within the free motion permissible zone in accordance with the variation of the cultivation environment, and moving the cultivating machine in accordance with the free motion permissible zone so as to offset the variation of the attitude of the cultivating roaching due to the variation of the cultivation environment, whereby the cultivating machine performs its cultivating work in a desired invariable cultivation condition, and a free-motion transmitting mechanism for transmitting the free-motion of the one of the tractor, the cultivating machine and the link mechanism in the free motion permissible zone to the cultivation-condition control mechanism.

The cultivation-condition control mechanism may include a cultivation-depth control mechanism for controlling a hydraulic lift mechanism of the tractor to move the cultivating machine upwardly or downwardly in accordance with a shift amount of the one of the tractor, the cultivating machine and the link mechanism on a plane containing a cultivation direction in the free motion permissible zone, so that a cultivation-depth of the cultivating machine is control led to be constant irrespective of the variation of the cultivation environment.

According to another aspect of the present invention, a tractor which is linked through a link unit to a cultivating machine and performs cultivating work in combination with the cultivating machine, includes a free motion permissible unit which is provided at a mount portion between the tractor and the link unit and through which the link unit is freely movable relatively to the tractor on a plane containing a cultivation direction in accordance with variation of a cultivation attitude of the cultivating machine due to variation or a cultivation environment, Further, according to another aspect of the present invention, a cultivating machine which includes an erect mast, a body frame and a rear mast for linking the erect mast and the body frame, the cultivating machine being linked through a link unit to a tractor and performing a cultivating work in combination with the tractor, includes a free motion permissible unit which is provided at at least one of the erect mast and the rear mast, and through which the cultivating machine is freely movable relatively to the link unit on a plane containing a cultivation direction in accordance with variation of a cultivation attitude of the cultivating machine due to variation of a cultivation environment.

According to the present invention, when the attitude of the cultivating machine is varied due to the variation of the cultivation environment such as variation of soil type (hardness of soil), unevenness of the surface of soil or the like, this variation is detected by the free-motion unit as a relative movement of at least one of the tractor, the link mechanism and the cultivating machine to the others in the free motion permissible zone of the free motion unit. This free motion is transmitted through the free motion transmitting mechanism to the cultivation condition (for example, plow depth) control. mechanism. The cultivation condition control mechanism controls the draft mechanism having the hydraulic lift mechanism to offset the variation of the cultivation attitude of the cultivating machine, for example, by upwardly or downwardly moving the cultivating machine. Through this operation, the cultivation attitude of the cultivating machine (For example, the plow-depth of the plow machine) can be controlled to be constant.

BRIEF DESCRIPTION OF THE DRAWINGS

FIG. 13 is a side view of the free-motion unit shown in FIG. 12;

FIG. 14 shows another embodiment of the free-motion unit when it is provided to the mast of the cultivating machine;

FIG. 20 shows a gear system when the free-motion unit comprises a movable mast and it is provided to the mast of the cultivating machine;

DETAILED DESCRIPTION OF THE PREFERRED EMBODIMENTS

Preferred embodiments according to this invention will be described hereunder with reference to the accompanying drawings.

Figure 1:
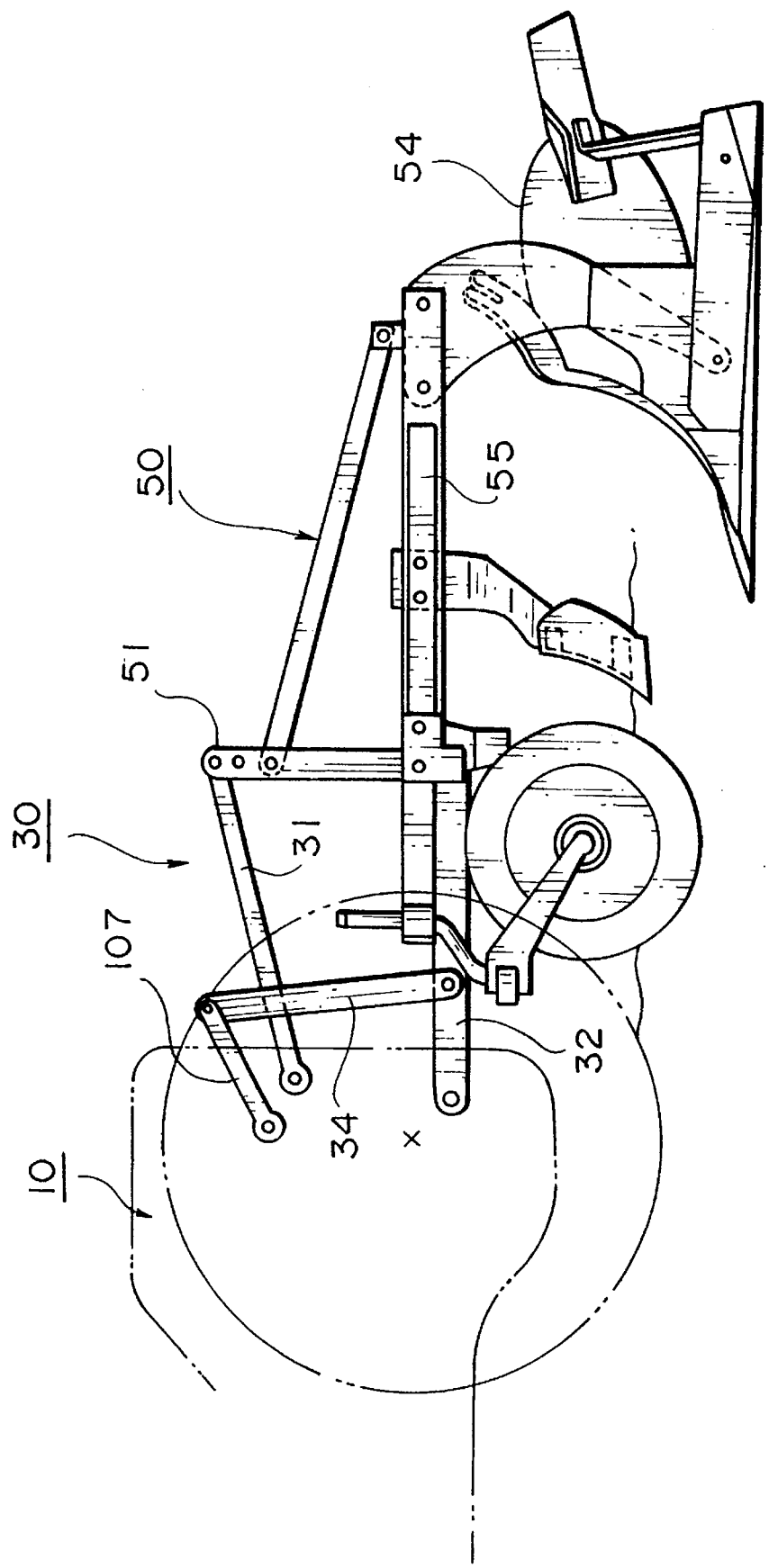
FIG. 1 is a schematic view showing the construction of a cultivation system including a tractor, a cultivating machine and a link mechanism for linking the tractor and the cultivating machine Lo each other according to this invention.

FIG. 1 shows the whole construction of an embodiment or a cultivating system including a tractor, a cultivating machine such as a plowing machine and a plow-depth controlling device.

In FIG. 1, reference numeral 10 represents a tractor, reference numeral 50 represents a plowing machine (bottom plow) and reference numeral 30 represents a three-point link mechanism. The tractor 10 has a hydraulic circuit with which a lift function for lifting the plowing machine up and down is performed, and it has a lift rod 34 for upwardly or downwardly moving the cultivating machine through a lower link 32 of the three-point link mechanism.

The three-point link mechanism 30 comprises an upper link 31, the lower link 32 and the lift rod 34, and the tractor 10 and the plowing machine 50 are linked to each other through the three-point link mechanism 30. The tractor 10 is also provided with a mount portion to which the three-point link mechanism 30 is secured.

Figure 2:
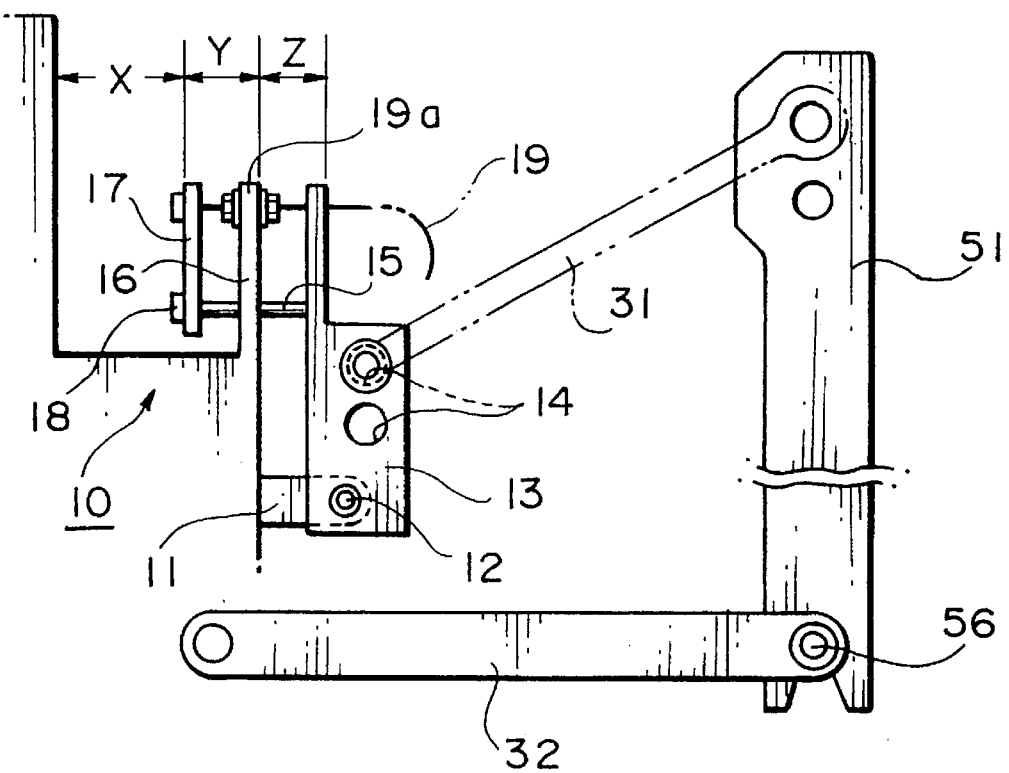
FIG. 2 shows an embodiment of a free-motion unit according to this invention when the free-motion unit is provided to the tractor.

FIG. 2 shows an embodiment of a free-zone unit in which the tractor 10 and the plowing reach 50 are freely movable relatively to each other and with which this relative motion between the tractor 30 and the plowing machine 50, that is, the attitude of the plowing machine 50 is detected and transmitted to a plow-depth control mechanism as described later.

In FIG. 2, a hinge plate 13 is provided at the mount portion of the tractor 10 to which the upper link 31 of the three-point link mechanism 50 is secured. A lower portion of the hinge plate 13 is pivotally supported through a pin 12 by a support member 11 which is provided so as to extend from the end of the tractor backwardly. Two mount holes 14 are vertically formed in the hinge plate 13, and one end of the upper link 31 is selectively fixed to one of the holes 14.

A guide rod 15 is further provided at the upper portion of the hinge plate 13 so as to horizontally extend from the hinge plate 13 and penetrate through an unloaded hole of a guide portion 16 of the tractor 10 so that the guide rod 15 is freely movable along its axial direction. Accordingly, the hinge plate 13 is swingable around the pin 12, and thus the guide rod 15 is freely movable horizontally (in its axial direction) in synchronism with the swing motion of the hinge 13. The end portion of the guide rod 15 is secured to a wire support plate 17 of the tractor 10 through a nut 18. The position of the guide rod 15 on the wire support plate 17 is adjusted by the nut 18. One end portion of a wire 19 for transmitting the motion or the hinge plate 13 is secured to the wire support plate 17, and the other end portion of the wire 19 is passed through a wire guide 19a provided to The guide portion 16 and fixed to an input side of a hydraulic circuit For draft control as described above. In this embodiment, a free-zone are a corresponds to a space in which the hinge plate 13, that is, the guide rod 15 is freely movable, and the positional relationship between the tractor 10 and the plowing machine 50, that is, the attitude of The plowing machine 50 is detected and transmitted to a plow-depth control mechanism containing the hydraulic circuit by the hinge plate 13 and the wire 19.

The plow-depth control device of this embodiment includes a free-zone unit comprising the hinge plate 13, the guide rod 15 and the wire support plate 17, a mot ion transmit king unit comprising the wire 19 and a plow-depth control mechanism which comprises the hydraulic circle it and other elements as described later for performing the draft control.

As described above, the one end of the upper link 31 is linked to one of the holes 14, and the other end thereof is linked to a mast 51 or the plowing machine 50 (cultivating machine). In this embodiment, the relative positional variation between the tractor and the plowing roaching is changed to the swing motion of the hinge plate 13, that is, the horizontal positional shift of the guide rod 15. The horizontal positional shift of the guide rod 15 is represented by variation of X, Y and Z shown in FIG. 2, and this variation is transmitted through the wire 19 to the hydraulic circuit. Through the operation of the hydraulic circuit, the attitude the plowing machine is controlled so that the plow depth is invariable.

Figure 3:
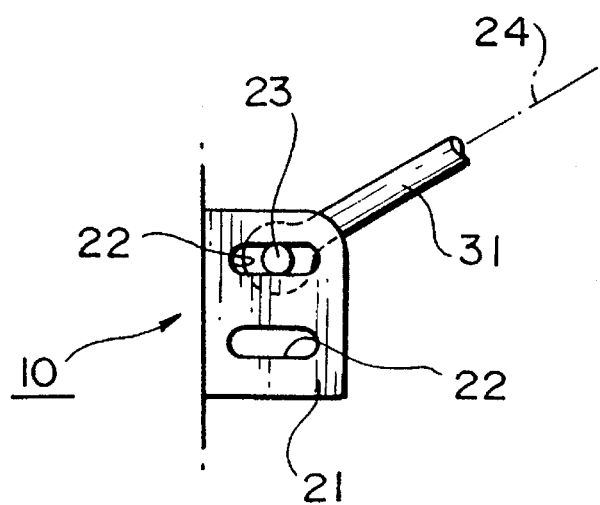
FIG. 3 shows a modification of the free-motion unit shown in FIG. 2.

FIG. 3 shows another embodiment of the free-zone unit. In this embodiment, in place of the hinge plate 13, a support plate 21 is provided at the mount portion of the tractor 10 for the upper link 31. In this case, two horizontally elongated holes 22 are provided at two stages in the vertical direction, and the upper link 31 is fixed to one of the elongated holes 22 through pin 23 so that the pin 23 is horizontally movable along the elongated hole 22. A wire 24 is secured to the pin 23 to transmit a motion of the pin 23 to the plow-depth control mechanism.

In the former embodiment, the end portion of the hinge plate 13 to which the upper link 31 is secured is swingable around its supporting point, and this swingable motion of the hinge plate 13 is transmitted to the horizontal motion of the guide rod 15 and then transmitted to the plow-depth control. On the other hand, in the latter embodiment the hinge plate 13 is not provided, however, since the end portion on the upper link 31 is movable along tire elongated hole 22, this horizontal motion of the upper link 31 along the elongated hole 22 is directly transmitted to the plow-depth control mechanism.

Figure 4:
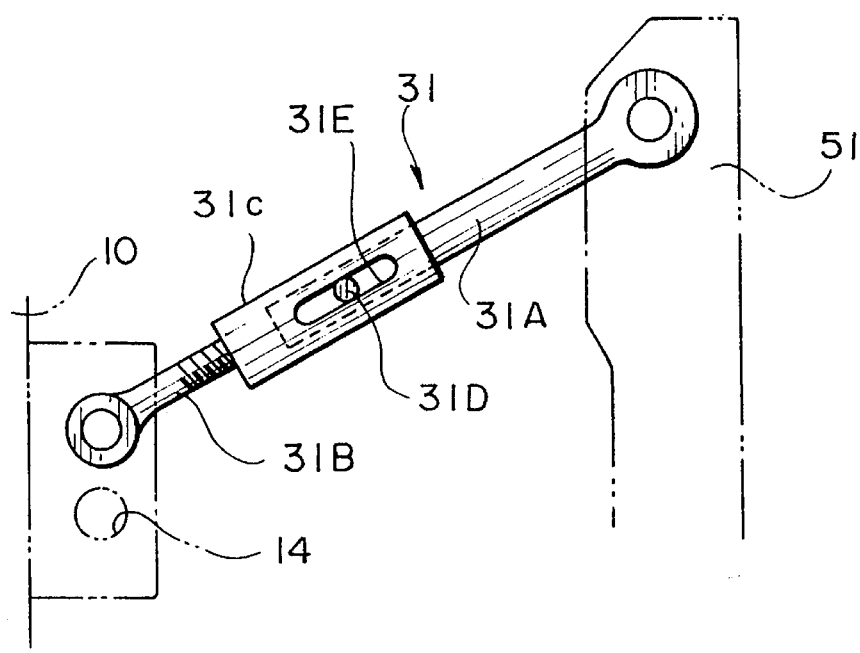
FIG. 4 shows another embodiment of the free-motion unit according to this invention when the free-motion unit is provided to an upper link of the link mechanism.

FIG. 4 shows another embodiment of the free-zone unit of the plow-depth control device. In this embodiment, the upper link 31 itself is designed to be variable in length along its longitudinal direction. The upper link 31 of this embodiment is divided into two parts, a front upper link 31B and a rear upper link 31A. The end portion of the rear upper link 31A is designed to be insertable into a cylinder portion 31C which is formed at one end portion of the front upper link 31B, and a pin 31D is provided to the side surface of the rear upper link 31A so as to project through an elongated hole 31E formed at the cylinder portion 31C. Therefore, both of the front and rear upper links 31B and 31A are relatively movable over the length of the elongated hole. The pin 31D is fixed to one end of a wire 33 for transmitting the length variation in the longitudinal direction of the upper link 31 to the plow-depth control mechanism containing the hydraulic circuit, and the wire 33 is supported by a guide and extends to the plow-depth control mechanism. That is, the relative shift amount between the front and rear upper links 31B and 31A is transmitted to the plow-depth control mechanism through the wire 33. The end portion to the front upper link 31B is pivotally secured in the hole 14 of the mount portion of the upper link 31 through a pin. Further, the front upper link 31B and the cylinder portion 31C are joined to each other with a screw so as to have a turnbuckle function. Therefore, the whole length of the upper link 31 can be adjusted by the screw-fitting position.

The free-zone units of the above embodiments are provided to the end portion (mount portion) of the tractor for the three-point link mechanism, or the upper link 31 of the three-point link mechanism. However, in the following embodiments, the free-zone unit is provided to The plowing machine itself.

Figure 5:
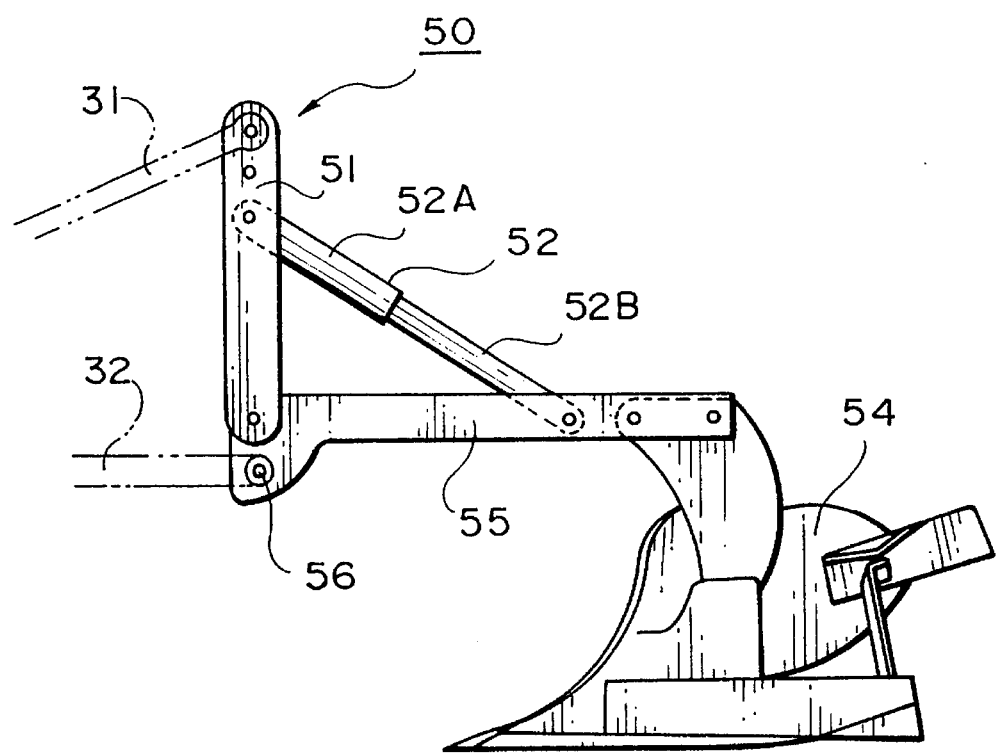
FIG. 5 shows another embodiment or the free-motion unit according to this invention when the free-motion unit is provided to a rear mast of the cultivating machine.

FIG. 5 shows another embodiment of the free-zone unit which is provided to a rear mast 52 of the plow machine 50. In FIG. 5, the plow machine 50 includes a mast 51, a rear mast 52, a frame 55 and a bottom plow 54 which is secured to the frame 55. The rear mast 52 is designed to be variable in length. Specifically, the rear mast 52 comprises an upper rear mast 52A and a lower rear mast 52B, and the lower rear mast 521) is insertable into the upper rear mast 52A. A pin 52C (FIGS. 6 and 7) provided to the side surface of one of the upper and lower rear masts 52A and 52B, and an elongated hole 52F is Formed on the side surface of the other rear mast. The upper and lower rear masts 52A and 52B are relatively movably linked to each other so that the pin 52C is projected through the elongated hole 52F and it is slidable along the elongated hole 52F.

The pin 52C is linked to one end portion of a wire 53, and the wire 53 is extended to the hydraulic circuit of the plow-depth control mechanism.

Figure 6:
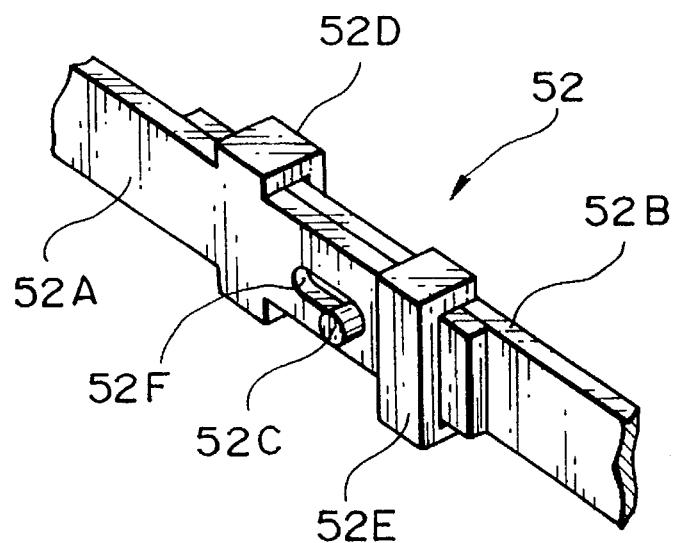
FIG. 6 shows a modification of the free-motion unit shown in FIG. 5.
Figure 7:
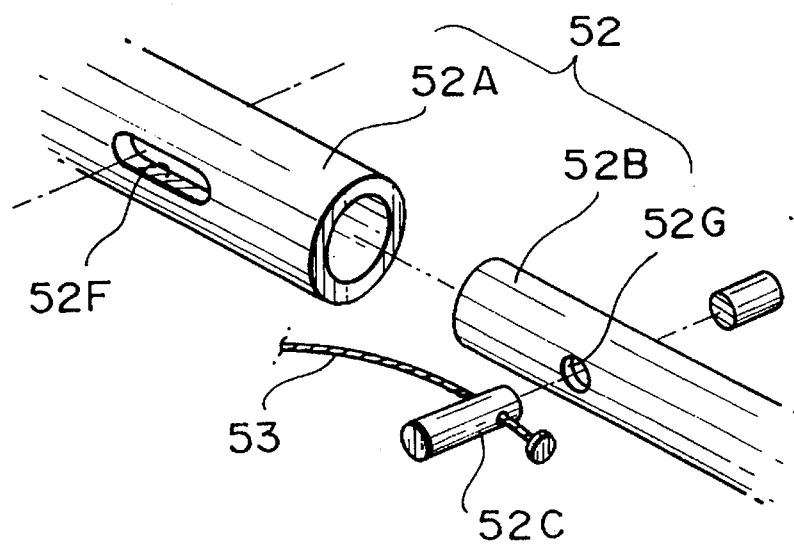
FIG. 7 shows another modification of the free-motion unit shown in FIG. 5.

FIGS. 6 and 7 show various types of the rear mast 52.

The rear mast 52 shown in FIG. 6 is formed of two flat plates. The rear mast 52 shown in FIG. 6 comprises a flat upper rear mast 52A and a flat lower rear mast 52B each of which is provided with a guide member 521) (52E) having U-shaped section, and these flat upper and lower rear masts 52A and 52B are linked to each other so that one end portions of the flat rear masts 52A and 52B are insertable into the guide members 52E and 52D of the other flat rear masts. The upper rear mast 52A is provided with an elongated hole 52F, and the lower rear mast 52B is provided with a pin 52C projecting From the side surface thereof. The flat upper and lower rear masts 52A and 52B are linked to each other so that the pin 52C is slidable along the elongated hole 52F over the whole length of the elongated hole 52F while projecting through the elongated hole 52F. Therefore, the rear mast 52A is variable in the longitudinal direction of the elongated hole 52F by a stroke corresponding to the length of the elongated hole 52F.

The rear mast 52 shown in FIG. 7 is formed of two pipe-shaped members. As shown in FIG. 7, the upper and lower rear masts 52A and 52B are designed so that one rear mast is insertable into the other rear mast. In this case, the lower rear mast 52B is designed to be able into the upper rear mast 52A. The upper rear mast 52A is provided with the elongated hole 52F, and the lower rear mast 52B is also provided with a through hole 52G. A common pin 52C to which the wire 53 is connected is inserted into the elongated hole 52F and the hole 52G so as to penetrate through these holes 52F and 52G in a state where the upper and lower rear masts 52A and 52B are linked to each other. The motion of the pin 52C is transmitted to the plow-depth control mechanism at the tractor side through the wire 53.

Figure 8:
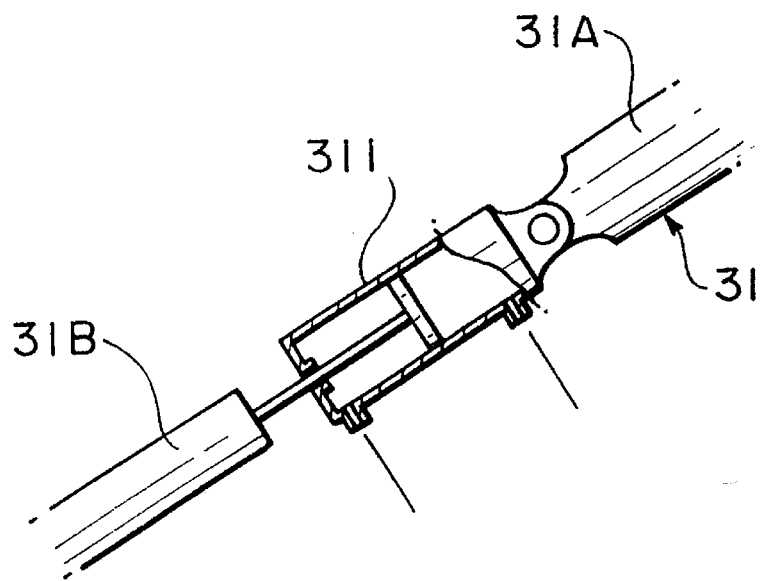
FIG. 8 shows an embodiment of a free-motion transmitting mechanism when it is applied to the embodiment shown in FIG. 4.

In the above embodiments, the variation of the cultivating conditions is detected and transmitted to the plow-depth control mechanism through the wire. In place of the wire, a differential pressure producing cylinder may be used to transmit the variation or the cultivating conditions to the plow-depth control mechanism. For example, as shown in FIG. 8, a differential pressure producing cylinder, 311 is built in the upper link 31, and a switch valve 103 (FIG. 15) as described later is directly or indirectly driven by a differential pressure due to fluid produced in the cylinder 311 to upwardly or downwardly move the lower link 32.

Figure 9:
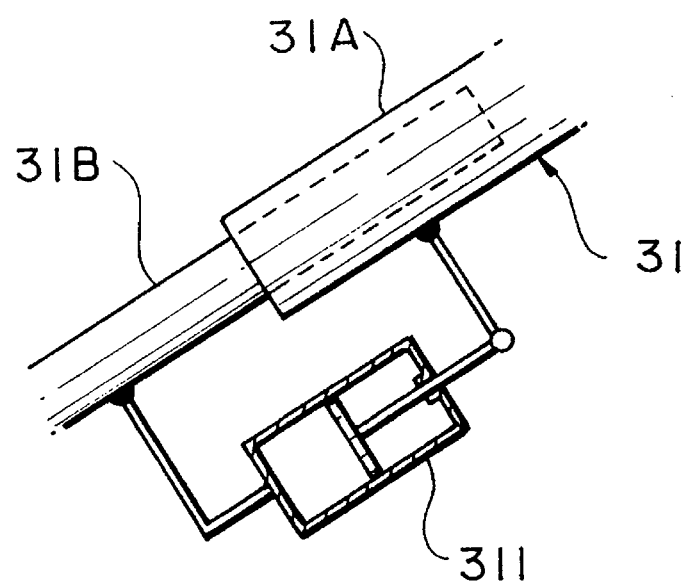
FIG. 9 shows a modification of the free-motion transmitting mechanism shown in FIG. 8.

Alternately, the differential pressure producing cylinder 311 may be provided at the outside of the upper link 31 and in parallel to the upper link 31 as shown in FIG. 9. In this case, the expanding and contracting motion of the upper link 31 is detected as a differential pressure of fluid.

In the above embodiment, the pressure differential cylinder is provided to the free zone unit of the upper link 31 shown in FIG. 4, however, it may be provided to the free zone unit of the tractor shown in FIGS. 2 and 3 or the rear mast shown in FIGS. 5 to 7.

In the embodiments as described above, the free-zone unit is provided to the mount portion of the tractor, the upper link of the three-point mechanism, or the rear mast of the plow machine. In the following embodiment, the free-zone unit is provided to the mast 51 of the plow machine 50.

Figure 10:
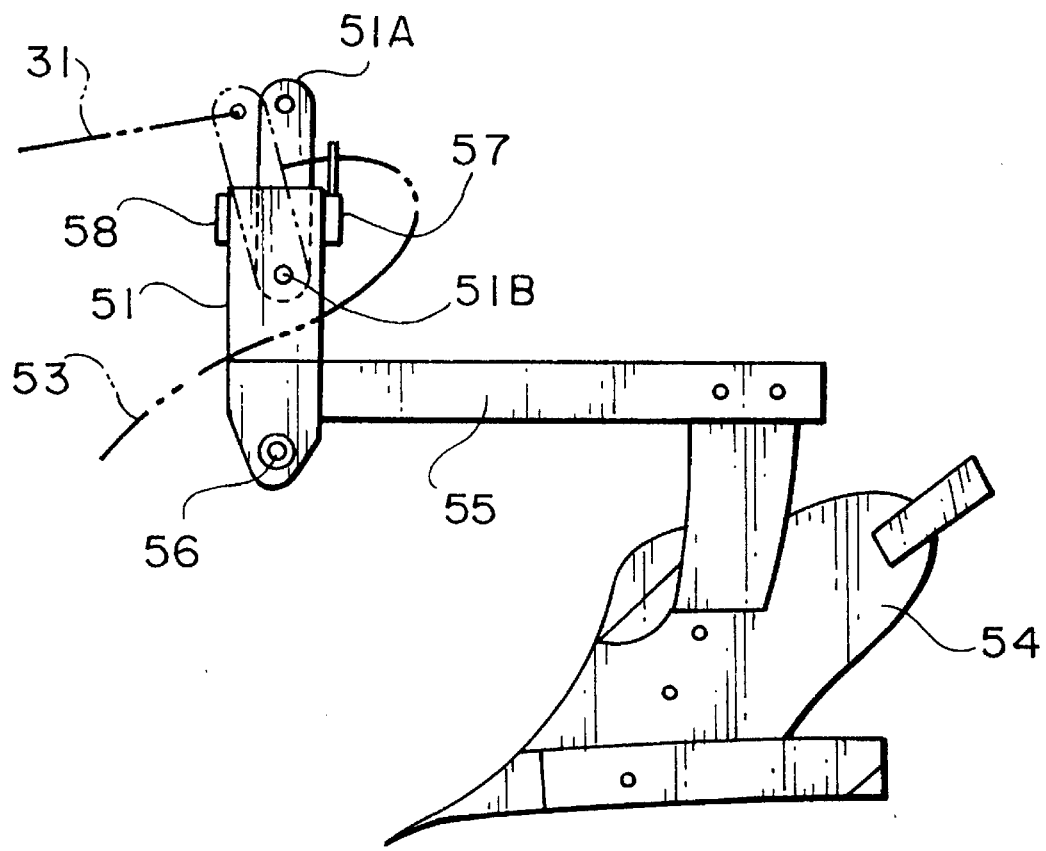
FIG. 10 shows another embodiment of the free-motion unit when it is provided to a mast of the cultivating machine.
Figure 11:
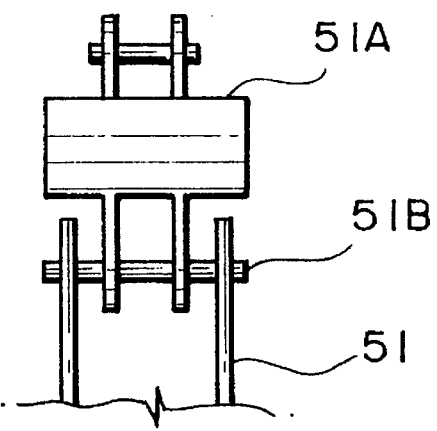
FIG. 11 is a side view of the free-motion unit shown in FIG. 10.

FIG. 10 is a side view of another embodiment of the free-zone unit of the plow-depth control device, and FIG. 11 is a front view of the free-zone unit. In this embodiment, a movable mast 51A is pivotally supported through a pin 51B at the top end of the mask 51 of the plow machine 50 so as to be movable on a plane containing a plow (cultivating) direction. The motion of the movable mast 51A is restricted by stoppers 58 and 57 which are provided at the front and rear end sides of the mast 51, that is, the movable mast 51A is movable between the sloppers 58 and 57 in accordance with variation of the cultivating condition. The movable mast 51A is provided with a hole at the top end thereof, and also provided with a wire 53 which is connected to the plow-depth control mechanism. The upper link 31 is secured through this hole to the movable mast 51A, whereby the upper link 31 is linked to the movable mast 51A, and the motion of the movable mast 51A transmitted to the plow-depth control mechanism through the wire 53.

Figure 12:
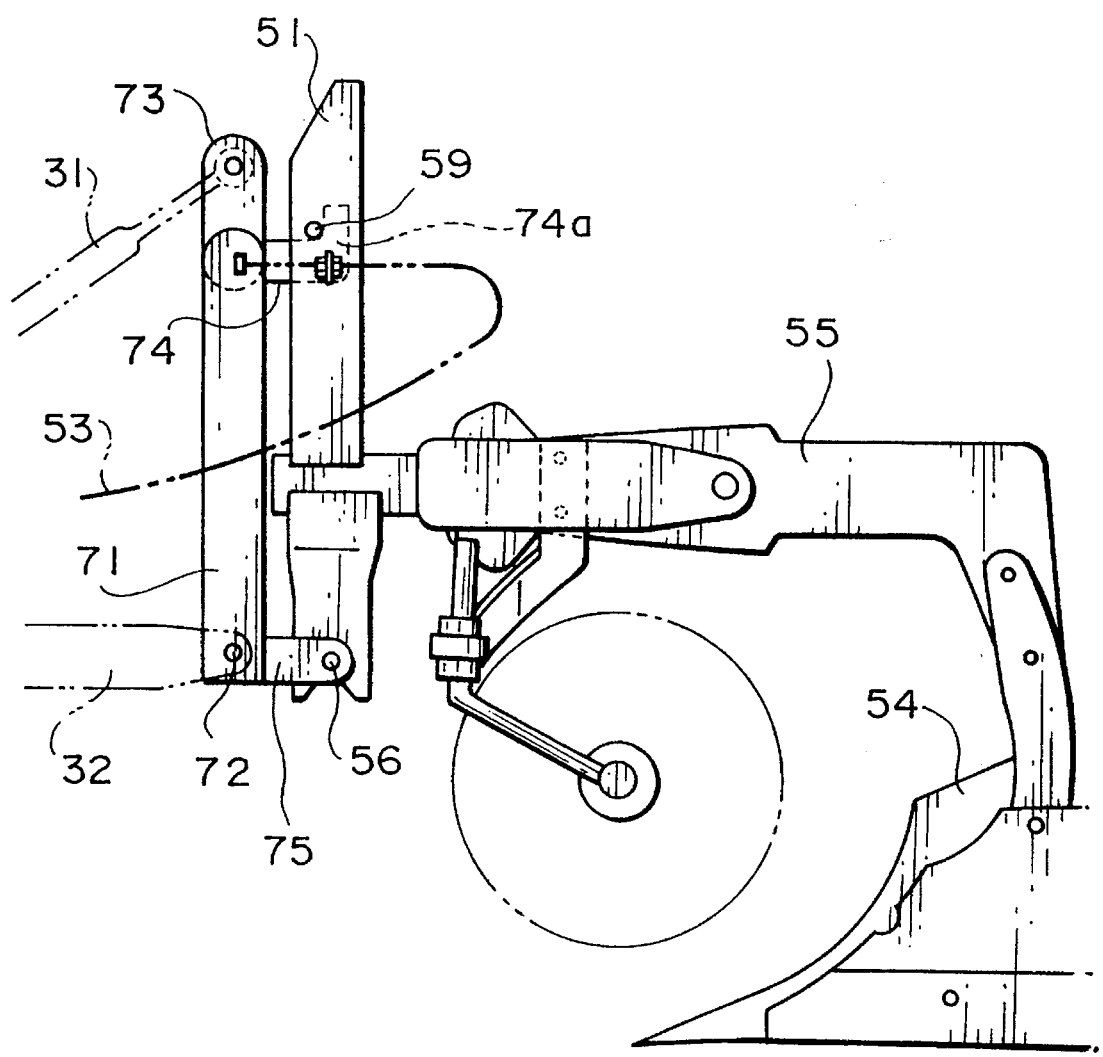
FIG. 12 shows another embodiment of the free-motion unit when it is provided to the mast of the cultivating machine.

FIG. 12 is a side view of another embodiment of the free-zone unit of the plow-depth control device, and FIG. 13 is a front view of the free-zone unit.

In this embodiment, the upper link 31 is not directly linked to the mast 51 of the plow machine, but it is linked to the mast 51 through an intermediate mast 71. The intermediate mast 71 is designed in an arcuate shape as shown in FIG. 13, and a stopper 74 is provided to the top end portion of intermediate mask 71 so as to project to the plow machine side. The mast 51 is provided with a pin 59, and the stopper 74 is designed to be hooked to the pin 59 from the rear side (flow machine side).

A small gap is kept between a hook 74a of the stopper 74 and the pin 59, so that both of the hook 74a and the slopper 74 are prevented from abutting against each other in a state where the intermediate mast 71 and the mast 51 of the plow machine are erected in parallel to each other. However, when the plow machine 50 is forwardly tilted, the mast 51 abuts against the intermediate mast 71 and pushes it forwardly. On the other hand, when the plow machine 50 is backwardly tilted, the pin 59 of the mast 51 abuts against the hook 74a of the slopper 74, and acts as if it attracts the intermediate mast 71 to the plow machine side.

A seat 75 for securing the lower link 32 to the plow machine 50 through a pin 56 is provided to the lower end portion of the mast 51 so as to project to the plow machine 50. Accordingly, a space between the hook 74a and the intermediate mast 71 serves as a free zone, and the hook 74a and the intermediate 71 serves as the free-zone unit.

FIG. 14 is a side view of another embodiment of the free-zone unit of the plow-depth control device, In this embodiment, the plow machine 50 has a mast 51 erecting at the central position of the plow-width direction. The mast 51 is provided with an elongated mount hole 51X, and a mount pin 31X is provided to the upper link 31 so as to penetrate through the upper link 31 in a traverse direction. The upper link 31 is linked to the mast 51 of the plow machine 50 by the mount pin 31X passing through the upper link 31 and the mount hole 51X to the outside of the mast 51. In this case, the mount pin 31X (the upper link 31) is horizontally movable along the elongated mount hole 51X in accordance with variation of the attitude of the plow machine 50. The variation of the plow machine 50 is detected by the free zone unit, and transmitted to the plow depth control mechanism through a wire connected to the pin 31X, whereby the attitude of the plow machine is corrected to a normal state, that is, the plow depth is controlled to be constant.

Figure 15:
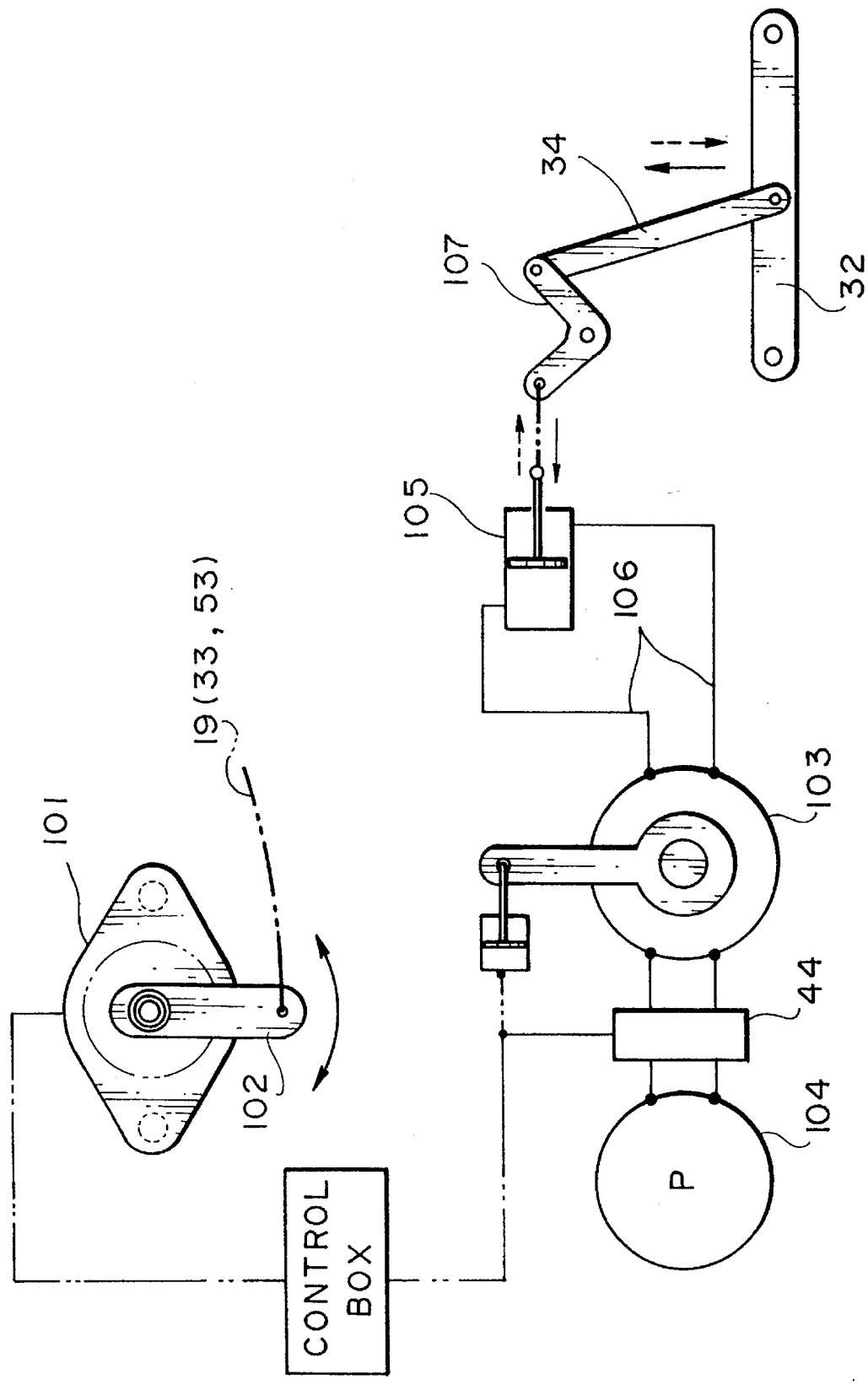
FIG. 15 is a schematic diagram showing a cultivation condition control mechanism according to this invention.

Next, the plow-depth control mechanism for detecting the variation in the cultivating conditions such as the positional variation at the mount portion of the tractor 10 for the upper link 31 shown in FIGS. 2 and 3, the length variation of the upper link 31 shown in FIGS. 4, 8 and 9, the variation of the length variation of the rear mast shown in FIGS. 5 to 7, the variation of the movable mast 51A shown in FIG. 10 to 13, and the variation of the mount pin 31X joined to the upper link 31 shown in FIG. 14 will be described with reference to FIG. 15.

FIG. 15 is a diagram showing the plow-depth control mechanism having a draft function. The wire 19 (24, 33, 53) through which the variation of the attitude of the plow machine, etc. is transmitted is connected to one end portion of an arm 102 of a rotary sensor 101. The motion of the wire is converted to an electrical signal through the rotary sensor 101. The electrical signal is input to a control box such as a microcomputer to perform a spool switching operation of a switch valve 103 which is provided to a hydraulic circuit for plow-depth control.

The draft function is to finally supply a control signal to the hydraulic circuit for upwardly or downwardly moving the lower link 32. The plow-depth control mechanism includes hydraulic pipes 106 which extend from a pump 104 through the switch valve 103 to a lift cylinder 105, and transmit a reciprocating motion of the lift cylinder 105 to a lift arm 107, whereby the lower link 32 linked to the end portion of the lift arm 107 is upwardly or downwardly moved. That is, the output signal of the sensor 101 is supplied to the control box such as a microcomputer, and it is used as a trigger signal for switching the switch valve 103 of the hydraulic circuit of the lift cylinder 105 of an elevating mechanism is installed to the tractor. Further, the output signal is also used as a signal for adjusting the open degree or a flow-amount control valve 44 installed In a hydraulic pipe, and on the basis of this signal, a hydraulic output of the hydraulic pump 104 is supplied to the lift cylinder 105 through the switch valve 103 of the hydraulic circuit formed of hydraulic pipes 106.

The lift cylinder 105 is expanded or contracted by the hydraulic output, and the lift rod 34 is moved by the lift arm 107, so that the lower link 32 is lifted up or pushed down.

In the above embodiment, the sensor 101 is described as a means of outputting an electrical signal, and specifically it may be formed of a load cell, a rotational distortion detector, a potentiometer or the like.

Accordingly, the plow machine which is linked to the lower link 32 is also upwardly or downwardly moved through the free motion in the free motion zone in accordance with the variation of the cultivating conditions.

Next, actual cultivating (plow) work using the cultivating system as described above when the free zone unit shown in FIG. 14 is representatively used will be described with reference to FIGS. 16, 17A, 17B, 18A, 18B and 19.

Figure 16:
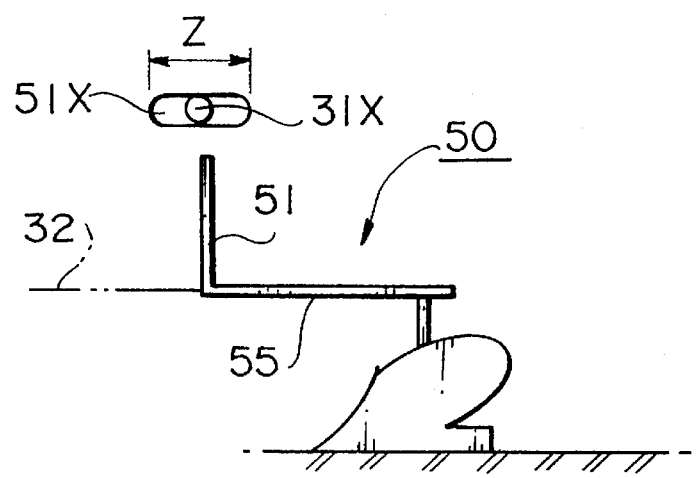
FIG. 16 is a schematic diagram of the cultivating machine at a normal state.
Figure 17A:
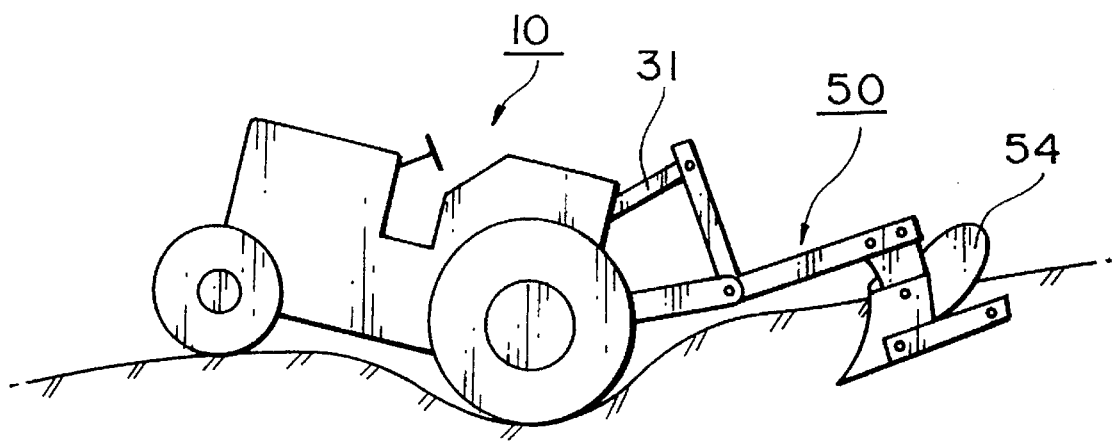
FIG. 17A is a schematic diagram showing the cultivation attitude of the cultivating system when the cultivating machine is forwardly tilted.

FIG. 16 is a schematic diagram showing a normal attitude of the plowing machine 50, and FIGS. 17A (17B) and 18A (18B) are schematic diagrams of abnormal attitudes (forwardly tilted and backwardly tilted attitudes) of the plowing machine 50. In the figures, Z presents the free zone in which the pin 31X is freely movable along the elongated mount hole 51X in accordance with variation of the cultivating environments. The normal attitude of the plowing machine means that the sectional structure of the soil of a field to be plowed is substantially homogeneous in hardness, and the soil surface is substantially smooth. In this normal state, the tractor is disposed substantially in parallel to the ground, and the plow machine is kept to an originally set attitude, that is, the mast 51 is vertically erected. Accordingly, plowing work is performed while the pin 31X of the upper link 31 is located at the central and neutral position of the free zone Z, and thus it is disposed in a neutral state without being deviated to the front and rear side.

Figure 17B:
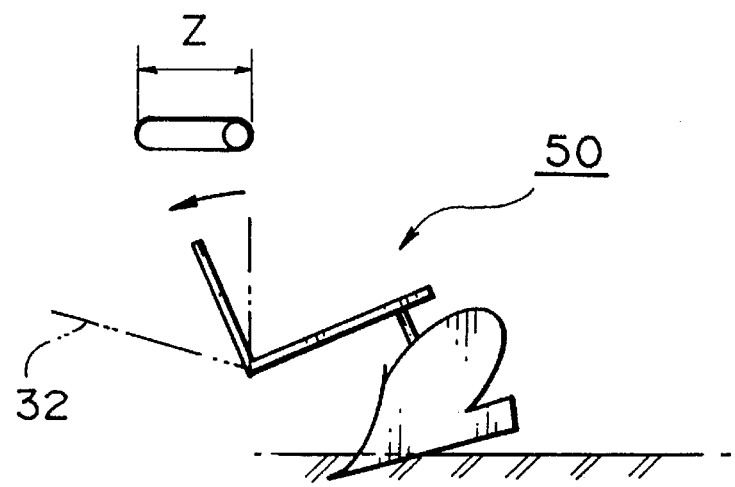
FIG. 17B is a schematic diagram showing the shift of the upper link in the free motion zone in the state shown in FIG. 17A.

When the rear wheels of the tractor pass over an recess portion as shown in FIG. 17A (or the front wheels pass over a projecting portion) or the plow machine abuts against a soft soil area (i.e., the surface soil is soft), the plow machine trends to be forwardly tilted as shown in FIG. 17B, in other words, the tip portion or the plow (shear point) trends to deeply sting into the soil, and thus the pin 31X in the free zone is shifted to the right end of the mount hole 51X ( the rear side of the plow direction) in the free zone. This shift of the pin 31X is transmitted to the plow-control mechanism as described above through the wire, and on the basis of the shift amount, the plow-depth control mechanism as shown in FIG. 15 lifts up the lower link 32 so that the tip portion of the plow 54 is kept to a horizontal attitude and the plow depth is made constant.

Figure 18A:
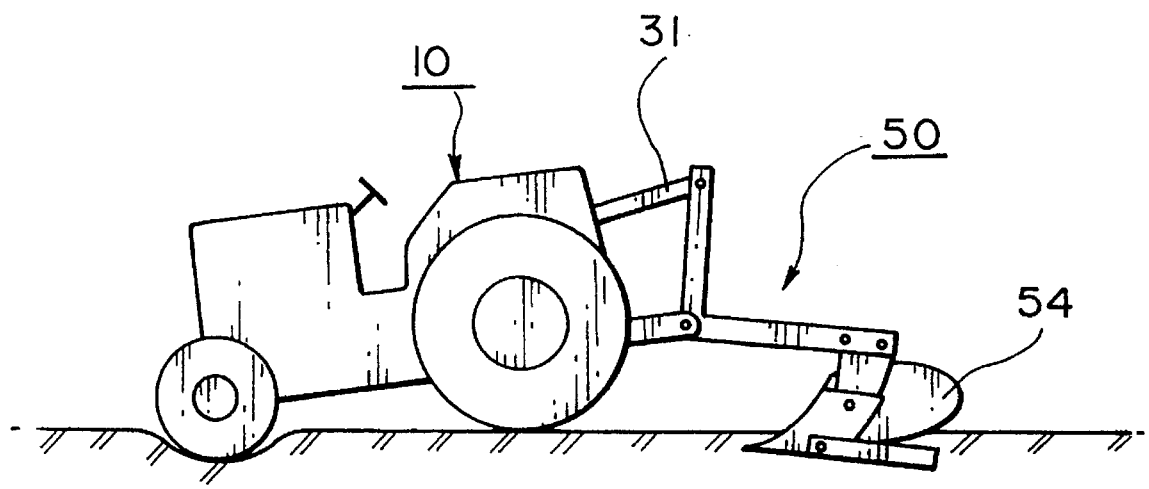
FIG. 18A is a schematic view showing the cultivation attitude of the cultivating system when the cultivating machine is backwardly tilted.
Figure 18B:
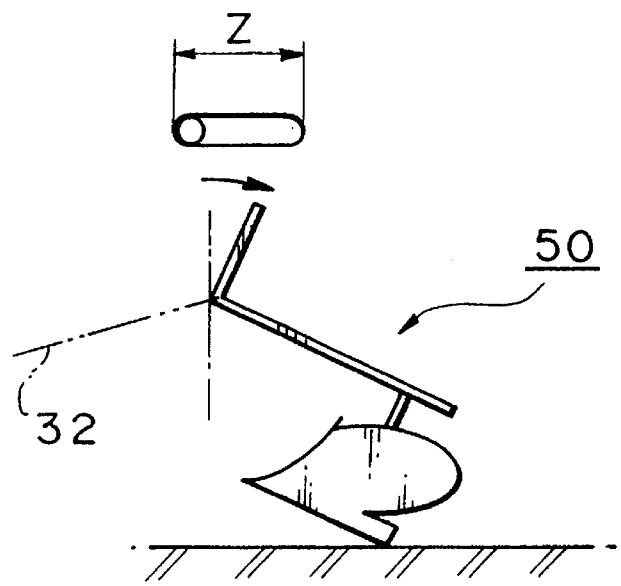
FIG. 18B is a schematic diagram showing the shift of the upper link in the free motion zone in the state shown in FIG. 18A.
Figure 19:
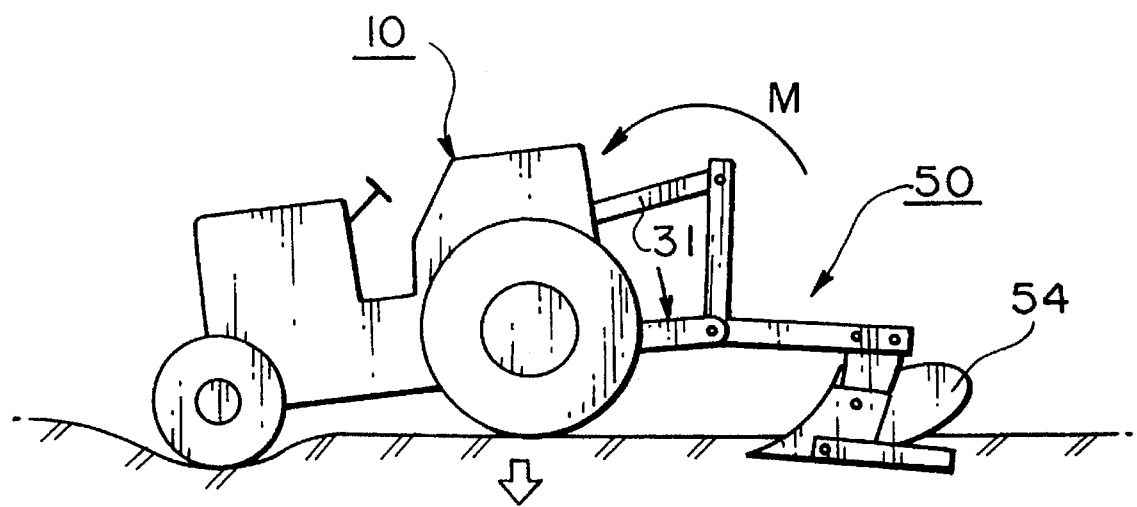
FIG. 19 is a schematic view showing an adjusting motion of the cultivating system to keep the cultivation attitude thereof to a desired fixed state.

On the other hand, when the front wheels of the tractor pass over a recess portion as shown in FIG. 18A (or the rear wheels pass a projecting portion) or the plow machine abuts against a hard soil area, the plow machine trends to be backwardly tilted as shown in FIG. 18B, in other words, the tip portion of the plow (shear point)trends to be floated from the soil, and thus the pin 31X in the free zone is shifted to the left end or the mount hole 51X (the front side of the plow direction) in the free zone. This shift of the pin 31X is transmitted to the plow-depth control mechanism as described above through the wire, and on the basis of the shift amount, the plow-depth control mechanism presses down the lower link 32 so that the tip portion of the plow 54 is kept to a horizontal attitude as shown in FIG. 19 and the plow depth is made constant.

Through the plow-depth control operation as described above, the cultivating system of this invention is kept so that the plow depth is invariable at all times irrespective of unevenness of the soil surface or variation of soil types (hardness, etc.).

Of course, the same plow-depth control operation is performed for not only the embodiment shown in FIG. 14, but also the other embodiments as described above.

In the above embodiments, the variation of the plowing machine is detected and transmitted to the rotary sensor of the plow-depth control mechanism through the wire or the differential pressure producing unit. In the following embodiment, the variation of the plowing machine is detected and transmitted through a gear system to the rotary sensor.

Figure 21:
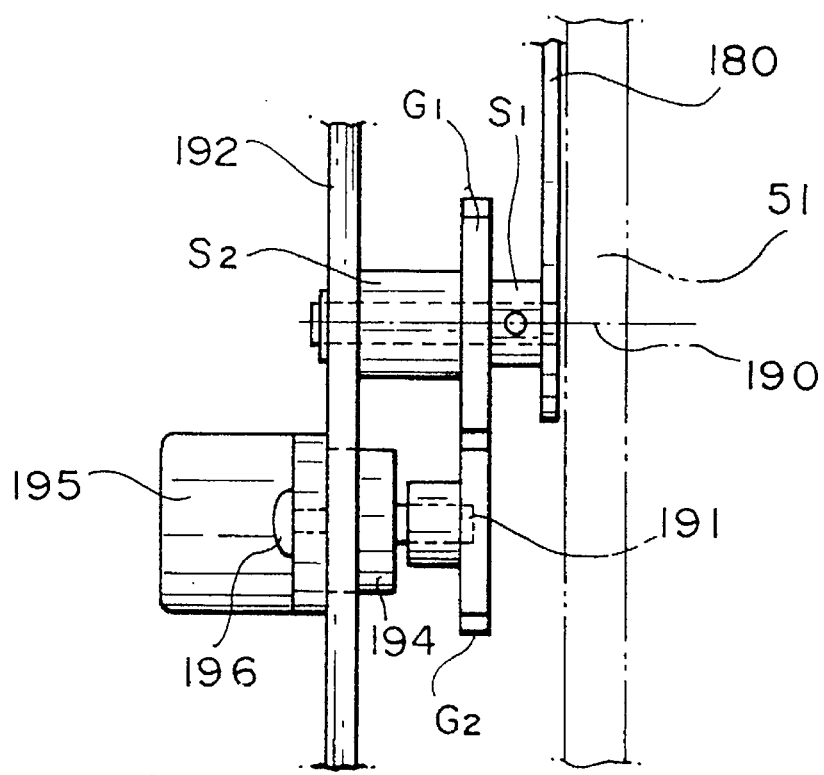
FIG. 21 is a cross-sectional view of the gear system shown in FIG. 20.

FIG. 20 is a side view of the free-zone unit of this embodiment, and FIG. 21 is a front view of the free-zone unit which is viewed from the side 21—21. This embodiment has the same construction as shown in FIG. 14 except that a movable mast and a gear system are provided to the mast 51. The same elements as the embodiment shown in FIG. 14 are represented by the same reference numerals.

In FIG. 20, as described with reference to FIG. 14, the mast 51 is provided with the elongated mount hole 51X through which the upper link 31 joined to the tractor 10 is linked to the plow machine 50, and also provided with the mount pin 31X so that the mount pin 31X penetrates through the mount hole 51X and the upper link 31. The mount hole 51X is designed to be elongated in a plow direction, so that the mount pin 31X is freely movable along the elongated mount hole 51X on a plane containing the plow direction, In this case, this freely-movable space of the mount pin 31X also serves as a free zone.

The mast 51 is also provided with a movable arm 180 on the outside surface thereof. The movable arm 180 has a mount hole 181 at one end portion thereof, and it is pivotally supported through a support shall 190 to the outside surface of the mast 51 so that the pin 31X penetrates through both of the mount holes 51X and 181. Accordingly, the movable arm 180 is freely swingable around the support shaft 190 by an amount corresponding to the whole length of the elongated mount hole 51X in synchronism with the horizontal motion of the pin 31X along the mount hole 51X.

The lower portion of the mast 51 of the plowing machine 50 is provided with securing portions 14 to be secured to the lower link 32 at both sides thereof in the plow width direction. The tractor suspends the lower link 32 through the lift rod 34, and the lift rod 34 is upwardly or downwardly moved rotation of the lift arm 107 as described later.

The plow-depth control device of this embodiment is substantially equal to those of the embodiment shown in FIG. 14 except that information on the motion of the pin 31X is transmitted to the plow-depth control mechanism through a gear system as described later.

As shown in FIGS. 20 and 21, a gear G1 is fixed to the support shaft 190 through a spacer S1 coaxially with the support shaft 190. One side face of the gear G1 which is opposite to the mast 51 is secured through a spacer 52 to a bracket 192 which is disposed in parallel to the mast 51. The bracket 192 is disposed at the outside of and in parallel to the mast 51 and fixed to the mast 51 through bolts 193 at an upper end position and an intermediate position thereof.

Another gear G2 which is engaged with the gear G1 and has a smaller number of teeth than the gear G1 is provided to the bracket 191 through a support shaft 191. The support shaft 192 has one end fixed to the gear G2 and the other end fixed to the bracket 192, and penetrates through a spacer 194. The support shaft 191 serves to keep constant the distance between the gear G2 and the bracket 192. Further, a rotary sensor 195 is secured to the end portion of the support shaft 191 to convert the rotational (swinging) motion of the movable arm 180 around the support shaft 190 to an electrical signal.

The rotary sensor 195 has a flange 195*b* at the outer periphery thereof, and two elongated adjustment holes 195*a* are formed on the periphery of the flange 195b to adjust the securing position of the sensor 195 to the bracket 192. That is, the flange 195b of the sensor 195 is secured to the bracket 192 by screwing the bolts 196 into the bracket 192 at any position within the elongated adjustment holes 195a. Therefore, the attitude of the flange 195b (sensor 195) can be adjusted in a range corresponding Lo the length of the elongated adjustment holes 195a. With this adjustment, an output line for the electrical signal of the sensor 195 can be selected to any position.

Figure 22:
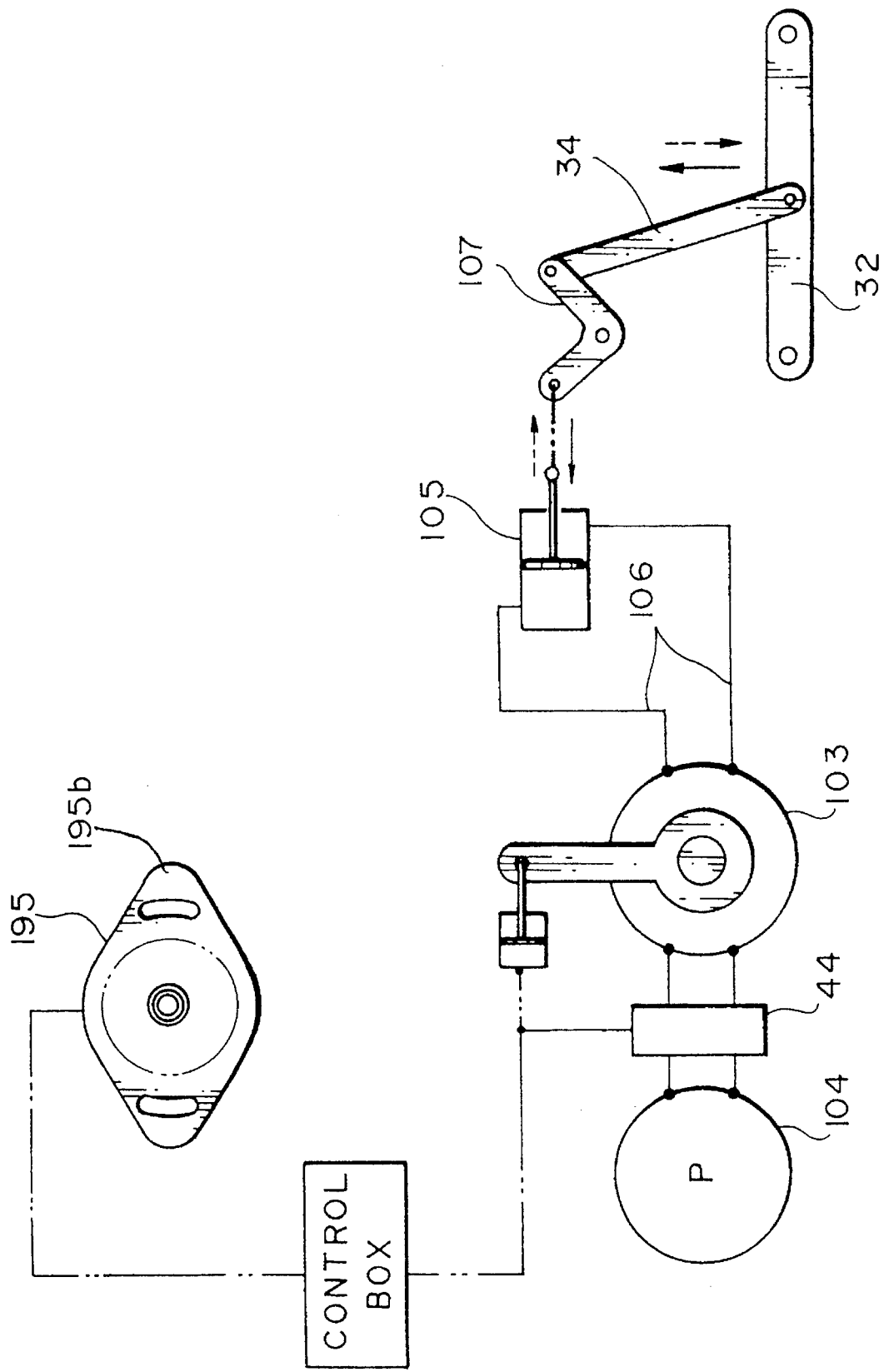
FIG. 22 is a schematic diagram showing another embodiment of the cultivation condition control mechanism for the embodiment shown in FIG. 20.

FIG. 22 is a schematic diagram showing the plow-depth control mechanism of this embodiment, and this plow-depth control mechanism is identical to that of FIG. 15 except for the construction of the rotary sensor. Like the plow-depth control mechanism shown in FIG. 15, in this embodiment, the output signal of the sensor 195 is supplied Lo The control box such as a microcomputer, and it is used as the trigger signal for switching the switch valve 103 of the hydraulic circuit of the lift cylinder 105 of the elevating mechanism which is installed to the tractor. Further, the output signal is also used as the signal for adjusting the open degree of the low amount control valve 44 installed in the hydraulic pipe, and on the basis of this signal, a hydraulic output of the hydraulic pump 104 is supplied to the lift cylinder 105 through the switch valve 103 of the hydraulic circuit formed of hydraulic pipes 106.

The lift cylinder 105 is expanded or contracted by the hydraulic output, and the lift rod 34 is moved by the lift arm 107, so that the lower link 32 is lifted up or pushed down.

In the above embodiment, the sensor 195 is described as means of outputting an electrical signal, and specifically it may be formed of a load cell, a rotational distortion detector, a potentiometer or the like.

Next, actual cultivating work when the free zone unit shown in FIGS. 20 and 21 is used will be described with reference to FIGS. 23 to 25.

Figure 23:
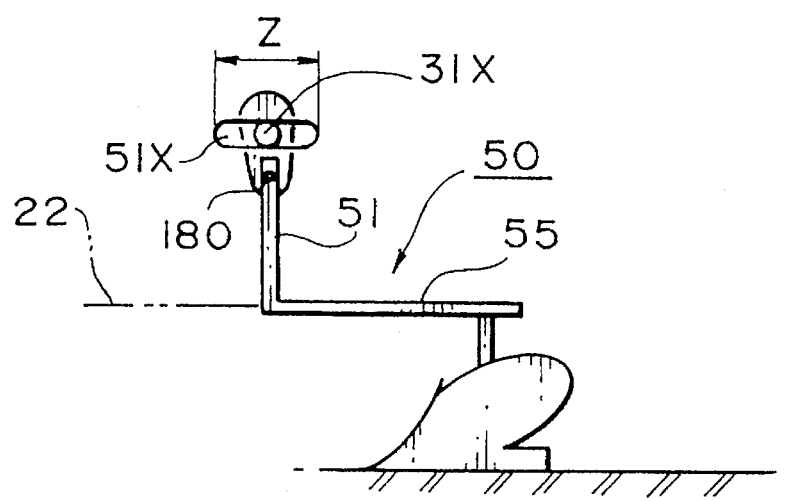
FIG. 23 is a schematic diagram showing the cultivating machine at a normal state in the embodiment shown in FIG. 20.
Figure 24:
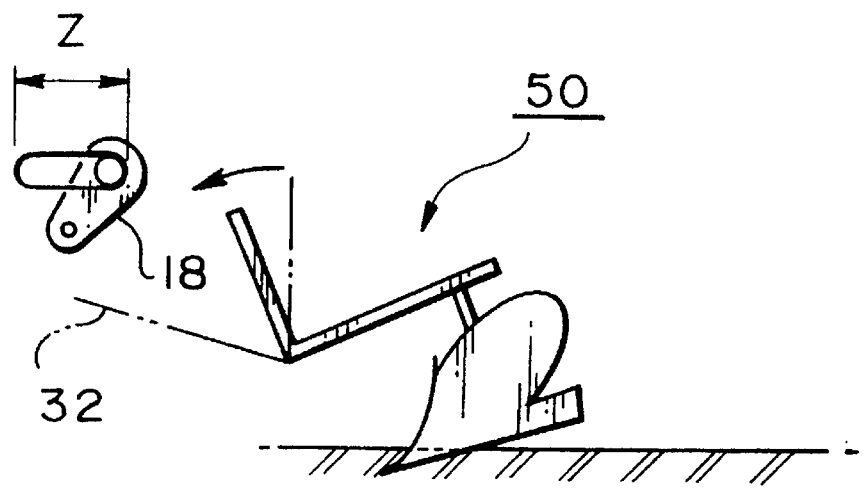
FIG. 24 is a schematic diagram showing the cultivating machine at a forwardly-tilt state in the embodiment shown in FIG. 20.
Figure 25:
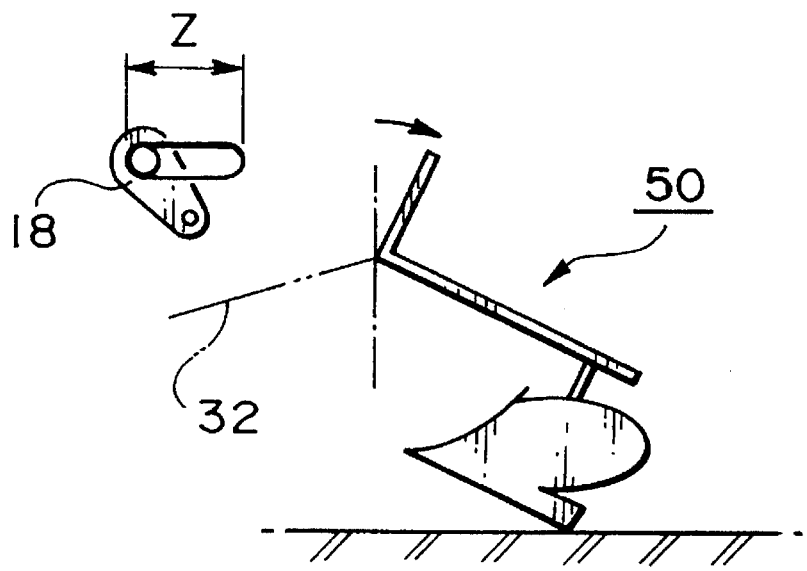
FIG. 25 is a schematic diagram showing the cultivating machine at a backwardly-tilt state in the embodiment shown in FIG. 20.

As described above, FIG. 23 shows the normal attitude of the plowing machine, and FIGS. 24 and 25 show the abnormal attitudes (forwardly tilted and backwardly tilted attitudes) of the plowing machine 50. The normal attitude of the plowing machine means that the sectional structure of soil of a field to be plowed is substantially homogeneous in hardness, and the soil surface is substantially smooth. In this normal state, the tractor is disposed substantially in parallel to the ground, and the plow machine is kept to an originally set attitude, that is, the mast 51 is vertically erected. Accordingly, the plowing work is performed while the pin 31X of the upper link 31 is located at the central position of the free zone Z, and thus it is disposed in a neutral state without being deviated to the front or rear side.

When the rear wheels of the tractor passes over an recess portion or the plow machine abuts against a soft soil area (i.e., the surface soil is soft), the plow machine trends to be forwardly tilted as shown in FIG. 24, in other words, the tip portion of the plow (shear point) trends to deeply sting into the soil, and thus the pin 31X in the free zone is shifted to the right end of the mount hole 51X ( the rear side of the plow direction) in the free zone.

At this time, the movable arm 180 is clockwisely rotated in FIG. 20, and an electrical signal corresponding to the rotational amount of the movable arm 180 is obtained by the sensor 195. That is, the rotation of the movable arm 180 is transmitted through the gear G1 to the gear G2, and at this time the rotation of the movable arm 180 is transmitted to tire sensor 195 while amplified by a gear group of the gears G1 and G2, so that even a slight variation in attitude of the movable arm 180 can be accurately transmitted to the sensor 195. Therefore, the attitude control can be performed with high precision.

The signal output from the sensor 195 is supplied to the control box to be processed, and then supplied to the control valve 144A of the hydraulic circuit and the switch valve 103, whereby the abnormal attitude of the plow machine shown in FIG. 24 is restored to the normal attitude shown in FIG. 23. That is, the lift cylinder 105 is contracted to clockwisely rotate the lift arm 107, so that the lift rod 34 is lifted up. This operation is continued until the attitude of the plowing machine 50 is returned to the attitude shown in FIG. 23, that is, the pin 31X is returned to the central and neutral position in the free zone. The correction of the attitude of the plowing machine 50 is detected on the basis of the output of the sensor 195.

On the other hand, when the front wheels of the tractor passes over a recess portion or the plow machine abuts against a hard soil area, the plow machine trends to be backwardly tilted as shown in FIG. 25, in other words, the tip portion of the plow (shear point) trends to be floated from the soil, and thus the pin 31X of the upper link is shifted to the left end of the mount hole 51X (the front side of the plow direction) in the free zone. In this case, the movable arm 180 is counterclockwise rotated, and this counterclockwise swinging motion is transmitted through the gears G1 and G2 to the sensor 195. The sensor 195 outputs a signal representing the counterclockwise motion of the movable arm 180.

On the basis of the above signal, the switch valve 103 is switched, and the open degree of the control valve 144A which corresponds to this signal is selected to control the hydraulic circuit. For example, the lift cylinder 105 is expanded and the lift arm 107 is clockwisely rotatedly around the support point to push the lift rod 34 down, so that the lower link 32 is pushed down and the bottom plow is corrected to a floating state.

This attitude correcting work is continued until the mount pin 31X is returned to the central and neutral position in the free zone Z, whereby the boore plow is kept at a constant weight within a predetermined range at all times. In other words, irrespective of variation of cultivating conditions such as variation in hardness of soil, unevenness of the ground, etc. in a field, cultivating work can be performed while the bottom plow (cultivating machine) 16 can be set to a predetermined range of plow depth.

This shift of the pin 31X is transmitted to the plow-control mechanism as described above the rough the wire, and on the basis of the shift amount, the control mechanism presses down the lower link 32 so that the tip portion of the plow 54 is kept to a horizontal attitude as shown in FIG. 23 and the plow depth is made constant.

Through the plow-depth control operation as described above, the cultivating system of this invention is kept so that the plow depth is kept invariable at all times irrespective of unevenness of the soil surface or variation of soil types (hardness, etc.).

According to this embodiment, even a slight variation of the attitude of the plowing machine is detected as a rotation of the movable arm (shift of the mount pin), and the rotation is amplified by the amplifying means (gear system) and then supplied to the sensor. Therefore, the status of the cultivating environment of the field and the attitude of the plowing machine can be surely detected to control the attitude of the plowing machine with high precision. In addition, even a slight rotation of the movable arm is amplified, the control can be finely performed to keep the plow depth in a predetermined range at all times with high precision.

As is apparent from the foregoing, according to this invention, the relative positional (attitude) variation between the tractor and the plowing machine is transmitted to the lift mechanism of the tractor as a signal detected in the free zone, and on the basis of the detected signal, the plowing machine is controlled to be upwardly or downwardly moved, so that the plow depth can be kept constant. In addition, the control of the attitude of the plowing machine makes the tractive force larger or smaller, so that the tractive force suitable for the cultivating work can be obtained.

In the above embodiments, the cultivating system of this invention is applied to control the attitude of the cultivating machine in the vertical direction, that is, in the depth direction, However, this invention is not limited to the control of the cultivating machine in the depth direction, but may be applied to the control of the attitude of the cultivating machine in the other direction (horizontal direction, etc.), or to the control of the attitude of the other elements other than the cultivating machine.

What is claimed is:

1. A cultivating system using a cultivating machine for performing a cultivating work for soil, a tractor having a lift mechanism for upwardly and downwardly moving the cultivating machine and a link mechanism having an upper link and a lower link for linking the tractor and the cultivating machine, comprising:

a free-motion mechanism provided to at least one of said tractor, said cultivating machine and said link mechanism, and having a free motion permissible zone in which the one of said tractor, said cultivating machine and said link mechanism is freely movable relative to the other two of said tractor, said cultivating machine and said link mechanism in accordance with variation of a cultivation attitude of said cultivating machine due to variation of a cultivation environment;

a cultivation-condition control mechanism for detecting a free motion of the one of said tractor, said cultivating machine and said link mechanism within the free motion permissible zone in accordance with the variation of the cultivation environment, and moving said cultivating machine in accordance with the free motion permissible zone so as to offset the variation of the attitude of said cultivating machine due to the variation of the cultivation environment so that the cultivating machine performs cultivating work in a desired invariable cultivation condition; and a free-motion transmitting mechanism for transmitting the free-motion of the one of said tractor, said cultivating machine and said link mechanism in the free motion permissible zone to said cultivation-condition control mechanism, said free-motion transmitting mechanism including a wire through which said free-motion mechanism and said cultivation-condition control mechanism are mechanically connected to each other to transmit the free-motion in the free motion permissible zone of said free-motion mechanism as a shift motion thereof, and a rotary sensor which is connected to said wire and serves to convert the shift motion of said wire to an electrical signal representing the free motion in the free motion permissible zone of said free-motion mechanism and supply the electrical signal to said cultivation-condition control mechanism.

2. The cultivating system as claimed in claim 1, wherein said cultivation-condition control mechanism includes a control unit for receiving information on the free motion in the free motion permissible zone of said free-motion zone and outputting a control signal, and a switch valve for controlling oil supply from a pump to said lift mechanism on the basis of the control signal from said control unit so that said cultivating machine is returned to an original cultivation attitude through the upwardly and downwardly moving operation of said cultivating machine by said lift mechanism.

3. The cultivating system as claimed in claim 1, wherein the variation of the cultivation environment corresponds to unevenness of the surface of soil, variation of soil type, or variation in hardness of soil.

4. The cultivating system as claimed in claim 1, wherein the variation of the cultivation attitude of said cultivating machine corresponds to tilt of said cultivating machine on a plane containing a cultivation direction relatively to a horizontal direction.

5. A cultivating machine including an erect mast, a body frame and a rear mast for linking said erect mast and said body frame, said cultivating machine being linked through a link unit to a tractor and performing cultivating work in combination with the tractor, comprising:

a free motion permissible unit which is provided at said rear mast, and through which said cultivating machine is freely movable relative to said link unit on a plane containing a cultivation direction in accordance with variation of a cultivation attitude of said cultivating machine due to variation of a cultivation environment, said free motion permissible unit including an expandable and contractible unit within a predetermined length in an axial direction thereof in accordance with the variation of the cultivation attitude of said cultivating machine, said expandable and contractible unit being formed integrally with said rear mast.

6. The cultivating machine as claimed in claim 5, wherein said expandable and contractible unit includes a first rear mast and a second rear mast slidably engaged with each other, one of said first and second rear masts having a pin projecting from a side surface thereof and the other of said first and second rear masts having an elongated hole serving as the free motion permissible zone through which the pin projects to be freely slidable therealong so that the first and second rear masts are linked to be relatively movable in the free motion permissible zone.

7. The cultivating machine as claimed in claim 6, wherein said first and second rear masts have tubular shapes.

8. The cultivating machine as claimed in claim 6, wherein said first and second rear masts are flat, each having a guide member with a U-shaped section, and are linked to each other so that each one end portion of the first and second rear masts is inserted into each guide member of the other of the first and second rear masts, respectively.

9. A cultivation condition detecting device for use in a cultivation system including a tractor having an upper link, and a cultivation machine which has a mast linked through the upper link to the tractor and performs a cultivation work in combination with the tractor, comprising:

a movable mast which is pivotally supported at one end portion thereof to said mast through a support pin and linked to said upper link at the other end portion thereof so that the other end portion of said movable mast is movable together with said upper link on a plane containing a cultivation direction in accordance with variation of a cultivation attitude of the cultivating machine;

a gear mechanism which is connected to said support pin and rotates together with said support pin, said gear mechanism converting free motion of said upper link Lo a rotational motion; and a rotary sensor which is connected to said gear mechanism and serves to convert the rotational motion of said gear mechanism to an electrical signal representing the free motion of said upper link in accordance with the variation of the cultivation attitude of said cultivating machine, so that the variation of the cultivation attitude of said cultivating machine is controlled to be suppressed on the basis of the electrical signal.

10. The cultivation condition detecting device as claimed in claim 9, wherein said gear mechanism includes a first gear which is fixed to said support pin, and a second gear which has a smaller number of teeth than said first gear and is fixed to said rotary sensor, said first and second gears being engaged with each other to thereby transmit the rotational motion of said first gear mechanism to said rotary sensor while amplifying the rotational motion.

11. The cultivation condition detecting device as claimed in claim 9, wherein said cultivating machine comprises a plow machine, and the variation of the cultivation attitude of said cultivating machine corresponds to variation of a plowing depth.

12. A cultivating machine linked through a link unit to a tractor and performing cultivating work in combination with the tractor, comprising:

an erect mast and a body frame connected to the erect mast, and a free motion permissible unit which is provided at said erect mast, and through which said cultivating machine is freely movable relative to said link unit on a plane containing a cultivating direction in accordance with variation of a cultivation attitude of said cultivating machine due to variation of a cultivation environment, said free motion permissible unit including a second mast linked between said link unit and said erect mast so that the link unit is freely movable in accordance with the variation of the cultivation attitude of said cultivating machine.

13. The cultivating machine as claimed in claim 12, wherein said second mast is linked to an upper link of said link unit at one end thereof and is pivotally mounted on said erect mast at the other end thereof, said one end of the second mast being freely movable according to the variation of the cultivation attitude.

14. The cultivating machine as claimed in claim 12, wherein said second mast is situated between the link unit and the erect mast and includes a stopper having a hook at a tip portion thereof to project toward the erect mast, said erect mast having a pin to which said stopper is hooked so that a gap between the hook and the pin serves as a free motion permissible zone, said erect mast being movable between said second mast and said hook according to the variation of the cultivation attitude.

15. A cultivating system using a cultivating machine for performing a cultivating work for soil, a tractor having a lift mechanism for upwardly and downwardly moving the cultivating machine and a link mechanism having an upper link and a lower link for linking the tractor and the cultivating machine, comprising:

a free-motion mechanism provided to at least one of said tractor, said cultivating machine and said link mechanism, and having a free motion permissible zone in which the one of said tractor, said cultivating machine and said link mechanism is freely movable relative to the other two of said tractor, said cultivating machine and said link mechanism in accordance with variation of a cultivation attitude of said cultivating machine due to variation of a cultivation environment;

a cultivation-condition control mechanism for detecting a free motion of the one of said tractor, said cultivating machine and said link mechanism within the free motion permissible zone in accordance with the variation of the cultivation environment, and moving said cultivating machine in accordance with the free motion permissible zone so as to offset the variation of the attitude of said cultivating machine due to the variation of the cultivation environment so that the cultivating machine performs cultivating work in a desired invariable cultivation condition; and a free-motion transmitting mechanism for transmitting the free-motion of the one of said tractor, said cultivating machine and said link mechanism in the free motion permissible zone to said cultivation-condition control mechanism, said free-motion transmitting mechanism including a gear mechanism which is directly engaged with said free-motion mechanism so that the free motion in the free motion permissible zone of said free-motion mechanism is directly converted to a rotational motion of said gear mechanism, and a rotary sensor which is connected to said gear mechanism and serves to convert the rotational motion of said gear mechanism to an electrical signal representing the free motion in the free motion permissible zone of said free-motion mechanism and supply the electrical signal to said cultivation-condition control mechanism.

16. The cultivating system as claimed in claim 15, wherein said cultivating machine includes an erect mast, a body frame and a movable mast which is pivotally supported at one end portion thereof to said mast through a support pin and linked to said upper link at the other end portion thereof so that the other end portion of said movable mast is movable on a plane containing a cultivation direction in accordance with variation of a cultivation attitude of the cultivating machine, and said gear mechanism includes a first gear which is fixed to said support pin and a second gear which has a smaller number of teeth than said first gear and is fixed to said rotary sensor, said first and second gears being engaged with each other.

17. A cultivating system for cultivating soil, comprising:

a cultivating machine for providing cultivating work for soil;

a tractor having a lift mechanism for upwardly and downwardly moving the cultivating machine and a mount portion, a link mechanism for linking the tractor and the cultivating machine and having an upper link and a lower link, said lower link being connected to the lift mechanism of the tractor so that when the lift mechanism moves, the cultivating machine moves corresponding to the movement of the lift mechanism, a free-motion mechanism provided at the tractor and free movably connected to one end of the upper link, said free-motion mechanism having a free motion permissible zone in which the upper link is freely movable relative to the tractor in accordance with variation of a cultivation attitude of said cultivating machine due to variation of a cultivation environment, a hinge plate provided at the mount portion of the tractor and connected to the upper link, and a guide rod having one end fixed to the binge plate and the other end secured to the tractor so as to be freely slidable in a cultivating direction so that the tractor and the cultivating machine are relatively movable through a slidable motion of the hinge plate in accordance with variation of the cultivation attitude of the cultivating machine, a free-motion transmitting mechanism for transmitting a free-motion of the upper link in the free motion permissible zone, and a cultivation-condition control mechanism for detecting the free motion of the upper link transmitted through the free-motion transmitting mechanism, said cultivation-condition control mechanism actuating the lift mechanism to move said cultivating machine in the free motion permissible zone so as to offset the variation of the attitude of said cultivating machine due to the variation of the cultivation environment so that the cultivating machine performs cultivating work in a desired invariable cultivation condition.

18. A cultivating system for cultivating soil, comprising:

a cultivating machine for providing cultivating work for soil;

a tractor having a lift mechanism for upwardly and downwardly moving the cultivating machine, a link mechanism for linking the tractor and the cultivating machine and having an upper link and a lower link, said upper link being formed of a first link secured to said tractor and a second link secured to said cultivating machine, said lower link being connected to the lift mechanism of the tractor so that when the lift mechanism moves, the cultivating machine moves corresponding to the movement of the lift mechanism, a free-motion mechanism provided between the first and second links of the upper link, said free-motion mechanism having a free motion permissible zone in which a length of the upper link formed of the first and second links is changeable in accordance with variation of a cultivation attitude of said cultivating machine due to variation of a cultivation environment, a free-motion transmitting mechanism for transmitting a free-motion of the upper link in the free motion permissible zone, said free-motion transmitting mechanism having a differential pressure producing cylinder and a piston situated in the cylinder, which are situated between the first and second links of the upper link and serve to convert the free motion of the free-motion mechanism to differential pressure, and a cultivation-condition control mechanism for detecting the free motion of the upper link transmitted through the free-motion transmitting mechanism, said cultivation-condition control mechanism receiving the differential pressure and actuating the lift mechanism to move said cultivating machine in the free motion permissible zone so as to offset the variation of the attitude of said cultivating machine due to the variation of the cultivation environment so that the cultivating machine performs cultivating work in a desired invariable cultivation condition.

19. A cultivating system for cultivating soil, comprising:

a cultivating machine for providing cultivating work for soil and having an erect mast;

a tractor having a lift mechanism for upwardly and downwardly moving the cultivating machine, a link mechanism for linking the tractor and the cultivating machine and having an upper link and a lower link, said lower link being connected to the lift mechanism of the tractor so that when the lift mechanism moves, the cultivating machine moves corresponding to the movement of the lift mechanism, a free-motion mechanism free movably situated between the erect mast and the upper link, said free-motion mechanism having a free motion permissible zone in which the upper link is freely movable relative to the erect mast in accordance with variation of a cultivation attitude of said cultivating machine due to variation of a cultivation environment, said free-motion mechanism being formed of an elongated mount hole serving as the free motion permissible zone formed in one of the erect mast and the upper link, and a mount pin formed on the other of the erect mast and the upper link and engaging the mount hole to link the upper link to the erect mast so that both of said mount pin and said upper link are movable along said mount hole in accordance with the variation of the cultivation attitude;

a free-motion transmitting mechanism for transmitting a free-motion of the upper link relative to the erect mast in the free motion permissible zone; and a cultivation-condition control mechanism for detecting the free motion of the upper link transmitted through the free-motion transmitting mechanism, said cultivation-condition control mechanism actuating the lift mechanism to move said cultivating machine in the free motion permissible zone so as to offset the variation of the attitude of said cultivating machine due to the variation of the cultivation environment so that the cultivating machine performs cultivating work in a desired invariable cultivation condition.

20. A cultivating system for cultivating soil, comprising:

a cultivating machine for providing cultivating work for soil;

a tractor having a lift mechanism for upwardly and downwardly moving the cultivating machine, and a mount portion, a link mechanism for linking the tractor and the cultivating machine and having an upper link and a lower link, said lower link being connected to the lift mechanism of the tractor so that when the lift mechanism moves, the cultivating machine moves corresponding to the movement of the lift mechanism, a free-motion mechanism provided at the tractor and free movably connected to one end of the upper link, said free-motion mechanism having a free motion permissible zone in which the upper link is freely movable relative to the tractor in accordance with variation of a cultivation attitude of said cultivating machine due to variation of a cultivation environment, a support plate formed at the mount portion of the tractor and having a horizontally elongated hole serving as the free-motion permissible zone, and a pin, said upper link being secured through the elongated hole to the support plate with the pin so that the support plate and the upper link are freely movable relative to each other in accordance with variation of the cultivation attitude of the cultivating machine, a free-motion transmitting mechanism for transmitting a free-motion of the upper link in the free motion permissible zone, and a cultivation-condition control mechanism for detecting the free motion of the upper link transmitted through the free-motion transmitting mechanism, said cultivation-condition control mechanism actuating the lift mechanism to move said cultivating machine in the free motion permissible zone so as to offset the variation of the attitude of said cultivating machine due to the variation of the cultivation environment so that the cultivating machine performs cultivating work in a desired invariable cultivation condition.

* * * * *